United States Patent
Gustafson et al.

(10) Patent No.: US 10,388,279 B2
(45) Date of Patent: Aug. 20, 2019

(54) VOICE INTERACTION APPARATUS AND VOICE INTERACTION METHOD

(71) Applicants: Joakim Gustafson, Stockholm (SE); Gabriel Skantze, Stockholm (SE); Martin Johansson, Stockholm (SE); Tatsuro Hori, Miyoshi (JP); Narimasa Watanabe, Nagakute (JP)

(72) Inventors: Joakim Gustafson, Stockholm (SE); Gabriel Skantze, Stockholm (SE); Martin Johansson, Stockholm (SE); Tatsuro Hori, Miyoshi (JP); Narimasa Watanabe, Nagakute (JP)

(73) Assignees: TOYOTA JIDOSHA KABUSHIKI KAISHA, Toyota-shi, Aichi-ken (JP); Furhat Robotics AB, Stockholm (SE)

(*) Notice: Subject to any disclaimer, the term of this patent is extended or adjusted under 35 U.S.C. 154(b) by 0 days.

(21) Appl. No.: 15/841,608

(22) Filed: Dec. 14, 2017

(65) Prior Publication Data
US 2018/0218731 A1 Aug. 2, 2018

(30) Foreign Application Priority Data
Feb. 1, 2017 (JP) .................................. 2017-016581

(51) Int. Cl.
*G06F 17/27* (2006.01)
*G10L 15/22* (2006.01)
(Continued)

(52) U.S. Cl.
CPC ........ *G10L 15/1822* (2013.01); *G06F 17/277* (2013.01); *G10L 15/1807* (2013.01);
(Continued)

(58) Field of Classification Search
CPC ..... G10L 15/22; G10L 15/26; G06F 17/2785; G06F 17/2755; G06F 17/277
See application file for complete search history.

(56) References Cited

U.S. PATENT DOCUMENTS

| 2001/0012335 A1* | 8/2001 | Kaufman | ............ H04M 3/4285 379/67.1 |
| 2002/0007275 A1* | 1/2002 | Goto | .................... G10L 15/1822 704/251 |

(Continued)

FOREIGN PATENT DOCUMENTS

JP 2007-188510 A 7/2007

*Primary Examiner* — Samuel G Neway
(74) *Attorney, Agent, or Firm* — Sighrue Mion, PLLC

(57) ABSTRACT

A syntactic analysis unit 104 performs a syntactic analysis for linguistic information on acquired user speech. A non-linguistic information analysis unit 106 analyzes non-linguistic information for the acquired user speech, the non-linguistic information being different from the linguistic information. A filler length determination unit 120 determines a length of a filler according to a non-linguistic information analysis result. A filler generation unit 130 generates a filler having a length corresponding to a result of a determination by the filler length determination unit 120. The filler length determination unit 120 determines that a long filler should be generated when a syntactic analysis result needs to be used to generate a response and, otherwise, determines that a short filler should be generated. The voice output unit 150 outputs the response generated by the response generation unit 140 after outputting the filler.

6 Claims, 15 Drawing Sheets

(51) Int. Cl.
  *G10L 15/26*  (2006.01)
  *G10L 15/18*  (2013.01)
  *G10L 25/48*  (2013.01)

(52) U.S. Cl.
  CPC .............. *G10L 15/22* (2013.01); *G10L 15/26* (2013.01); *G10L 25/48* (2013.01); *G06F 17/2755* (2013.01); *G06F 17/2785* (2013.01)

(56) References Cited

U.S. PATENT DOCUMENTS

| | | | |
|---|---|---|---|
| 2008/0167874 A1* | 7/2008 | Eide | G10L 15/22 704/257 |
| 2014/0074483 A1* | 3/2014 | van Os | G10L 15/22 704/275 |
| 2015/0206531 A1* | 7/2015 | Fujisawa | G10L 15/22 704/251 |
| 2015/0206532 A1* | 7/2015 | Fujisawa | G10L 15/22 704/251 |
| 2018/0068660 A1* | 3/2018 | Kawahara | G10L 15/26 |
| 2018/0218731 A1* | 8/2018 | Gustafson | G10L 25/48 |
| 2018/0227417 A1* | 8/2018 | Segalis | G06N 20/00 |
| 2018/0253280 A1* | 9/2018 | Kawahara | G06F 17/2755 |

* cited by examiner

FEATURE VECTOR $$V_i = (v_{i1}, v_{i2}, v_{i3}, v_{i4}, v_{i5}, \cdots, v_{im}, v_{i(m+1)}, v_{i(m+2)}, \cdots)$$
$$= (f0_T, V_T, f0, V, L1, \cdots, D1, 1, 1, \cdots)$$

| INFORMATION TYPE | ELEMENT | | COMPONENT VALUE | COMPONENT |
|---|---|---|---|---|
| i-th USER SPEECH INFORMATION | PHRASE END Tmsec | f0 | $f0_T$ | $v_{i1}$ |
| | | VOLUME | $V_T$ | $v_{i2}$ |
| | WHOLE SPEECH SECTION | f0 | f0 | $v_{i3}$ |
| | | VOLUME | V | $v_{i4}$ |
| | USER SPEECH LENGTH | | L1 | $v_{i5}$ |
| | ... | | ... | ... |
| HISTORY OF APPARATUS RESPONSES | DURATION OF SAME TOPIC | | D1 | $v_{im}$ |
| | TYPE OF IMMEDIATELY-PRECEDING RESPONSE | | 1 | $v_{i(m+1)}$ |
| | TYPE OF NEWEST QUESTION | | 1 | $v_{i(m+2)}$ |
| | ... | | ... | ... |

TYPE OF IMMEDIATELY-PRECEDING RESPONSE :
0: SHORT RESPONSE, 1: ATTENTIVELY-LISTENING RESPONSE, 2: QUESTION, 3: ANSWER

TYPE OF NEWEST QUESTION :
0: PROBING QUESTION, 1: TOPIC INDUCEMENT

Fig. 3

| No | SPEAKER | CONTENT OF SPEECH | | |
|---|---|---|---|---|
| 1 | APPARATUS | YOU VISITED KYOTO, DIDN'T YOU? | | |
| 2 | USER | HAVE YOU EVER BEEN TO KYOTO? | | |
| 3 | APPARATUS | WELL, YOU HAVE ASKED ME A QUESTION, HAVEN'T YOU? | LONG FILLER | T1 |
| 4 | USER | YAH. | | |
| 5 | APPARATUS | I THINK I'VE NEVER BEEN THERE. | | |
| 6 | USER | I SEE, I WILL TAKE YOU TO KYOTO IN THE NEAR FUTURE. | | |
| 7 | APPARATUS | IT'S DELIGHTFUL. | | |
| 8 | USER | UH-HUH. | | |
| 9-1 | APPARATUS | LET'S SEE. | SHORT FILLER | T2 |
| 9-2 | | HOW IS YOUR REHABILITATION GOING? | | |
| 10 | USER | FROM YESTERDAY. | | |
| 11 | APPARATUS | YAH. | | |

Fig. 5

FEATURE VECTOR
$v_i = (x_1, x_2, \cdots, x_{17})$

| INFORMATION TYPE | FEATURE | DIMENSION (COMPONENT) |
|---|---|---|
| i-th USER SPEECH INFORMATION | AVERAGE OF f0 IN 200 msec AT PHRASE END | $x_1$ |
| | STANDARD DEVIATION OF f0 IN 200 msec AT PHRASE END | $x_2$ |
| | MAXIMUM VALUE OF f0 IN 200 msec AT PHRASE END | $x_3$ |
| | INCLINATION OF f0 IN 200 msec AT PHRASE END | $x_4$ |
| | AVERAGE OF f0 IN 500 msec AT PHRASE END | $x_5$ |
| | USER SPEECH LENGTH | $x_6$ |
| | . . . . | . . . . |
| HISTORY OF APPARATUS RESPONSES | . . . . | . . . . |
| | DURATION OF SAME TOPIC | $x_{15}$ |
| | TYPE OF IMMEDIATELY-PRECEDING RESPONSE | $x_{16}$ |
| | TYPE OF NEWEST QUESTION | $x_{17}$ |

Fig. 13

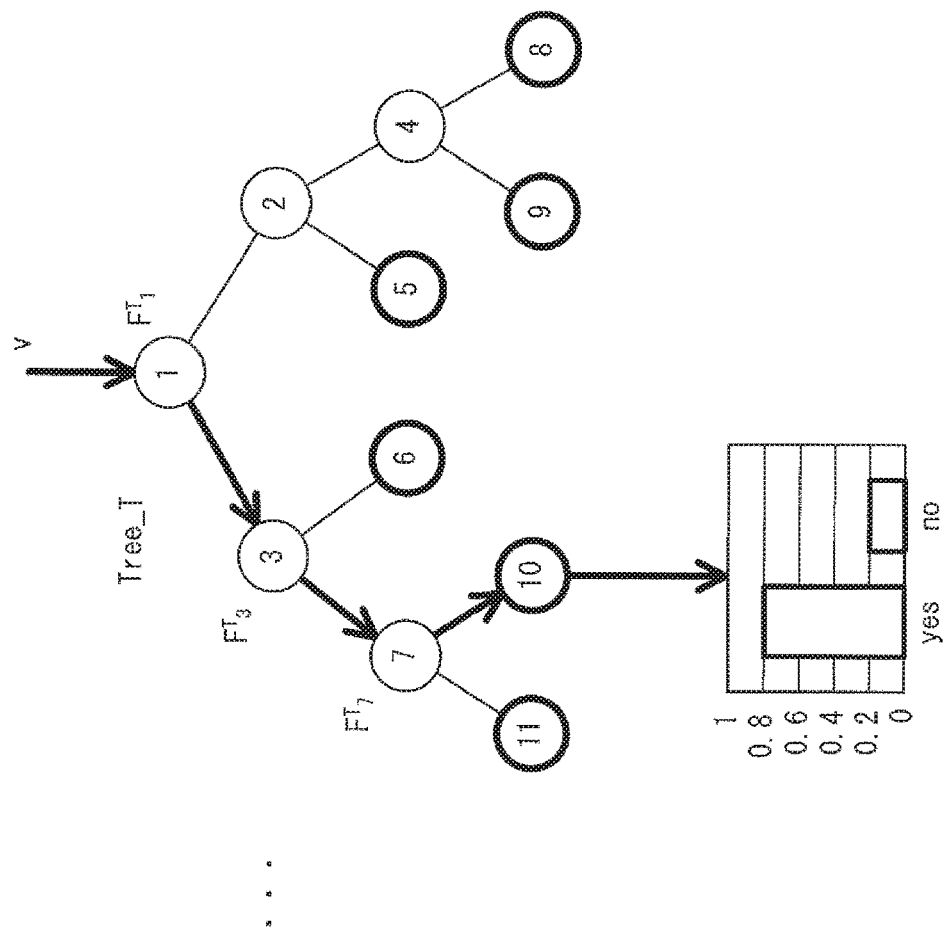
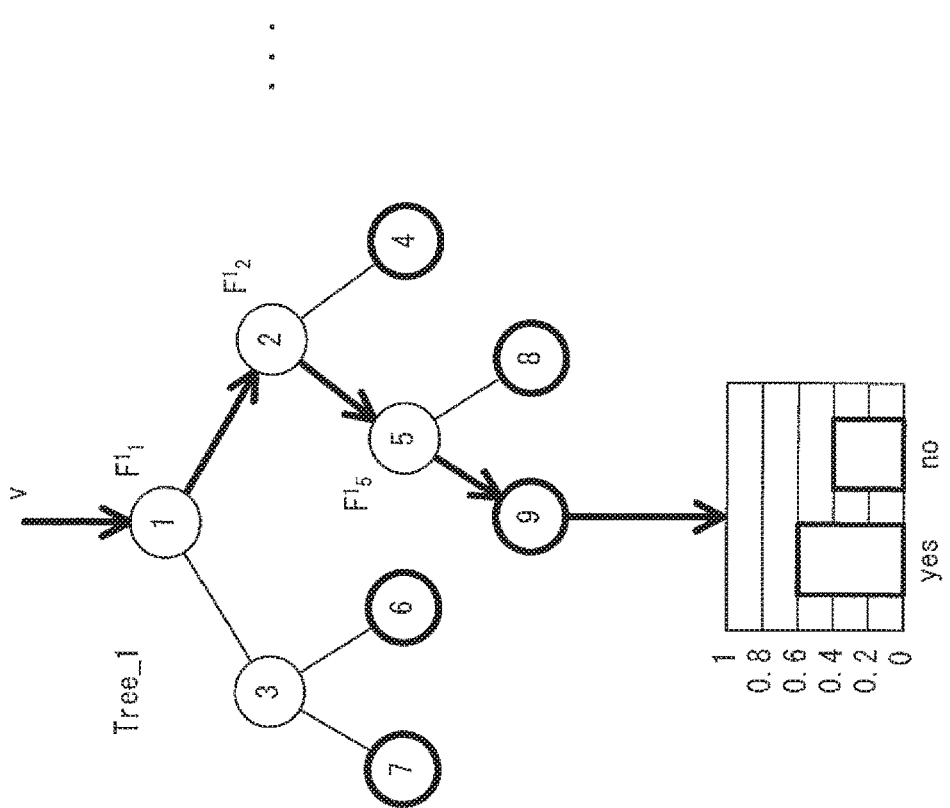
Fig. 17

VOICE INTERACTION APPARATUS AND VOICE INTERACTION METHOD

CROSS REFERENCE TO RELATED APPLICATIONS

This application is based upon and claims the benefit of priority from Japanese patent application No. 2017-016581, filed on Feb. 1, 2017, the disclosure of which is incorporated herein in its entirety by reference.

BACKGROUND

The present disclosure relates to a voice interaction apparatus and a voice interaction method, and in particular to a voice interaction apparatus and a voice interaction method for having a conversation with a user by using a voice.

A technique for enabling a user to enjoy a daily conversation with a voice interaction apparatus such as a voice interaction robot is becoming widespread. A voice interaction robot according to this technique recognizes a voice uttered by a user and produces (outputs) a reply to the recognized voice.

As a technique related to the above-described technique, Japanese Unexamined Patent Application Publication No. 2007-188510 discloses a conversation control system. The conversation control system disclosed in Japanese Unexamined Patent Application Publication No. 2007-188510 identifies each of the morphemes constituting the content of the user's speech (hereinafter simply referred to as "user speech"), analyzes the semantic content recognized from those specified morphemes, and acquires (i.e., retrieves) a content for a reply that is created in advance and associated with the obtained semantic content. By doing so, the conversation control system outputs an optimal content for a reply to the content of the user's speech.

SUMMARY

When a voice is recognized and a syntactic analysis including analyses of morphemes is performed as in the case of the technique disclosed in Japanese Unexamined Patent Application Publication No. 2007-188510, this analysis often consumes a very long time. This is because the process such as the syntactic analysis involves processing that requires a long time such as pattern recognition. Therefore, it sometimes takes a long time before a syntactic analysis for user speech is completed and a response to the speech is output. In such a case, the time between when a user utters a voice and when a voice interaction apparatus makes a response thereto increases, thus raising a possibility that the user has a feeling of wrongness.

To cope with such a case, it is conceivable that a voice interaction apparatus outputs a filler, which is a voice of a meaningless hesitation or a faltering expression (such as "Uh", "Well", "Umm", "Let's see", "I mean", etc.) between when a user utters a voice and when the voice interaction apparatus makes a response thereto. Note that there are a case where it is necessary to use a syntactic analysis result to generate a response and a case where it is unnecessary to use a syntactic analysis result to generate a response. Further, as descried above, the syntactic analysis requires a very long time. Therefore, the time required to generate a response in the case where the syntactic analysis result needs to be used may differ from the time required to generate a response in the case where the syntactic analysis result does not need to be used. Therefore, the time between when a user gives a speech and when a response is made thereto by a voice interaction apparatus (hereinafter simply referred to as "between user speech and a response thereto") may change according to the user speech.

In such cases, if the voice interaction apparatus outputs a filler that is much shorter than the time in which the voice interaction apparatus can output a response, the duration between the end of the output of the filler and the response by the voice interaction apparatus becomes long. As a result, there is a possibility that the above-described feeling of wrongness that the user has cannot be solved. On the other hand, if the voice interaction apparatus outputs a filler that is longer than the time in which the voice interaction apparatus can output a response, the user may wait an unnecessary amount of time. As described above, if the length of a filler that is output in response to user speech between the user speech and a response thereto by the voice interaction apparatus is not adjusted, it is very difficult to realize a natural conversation in accordance with the user speech.

The present disclosure provides a voice interaction apparatus and a voice interaction method capable of realizing a natural conversation according to user speech.

A first exemplary aspect is a voice interaction apparatus configured to have a conversation with a user by using a voice, including: a speech acquisition unit configured to acquire user speech, the user speech being speech given by the user; a syntactic analysis unit configured to perform a syntactic analysis for linguistic information on the acquired user speech; a response generation unit configured to generate a response according to the user speech; a voice output unit configured to output a voice for the user; a non-linguistic information analysis unit configured to analyze non-linguistic information for the acquired user speech, the non-linguistic information being different from the linguistic information and including at least one of prosodic information on the user speech and history information about a response generated by the response generation unit; a filler length determination unit configured to determine a length of a filler output by the voice output unit according to a non-linguistic information analysis result, the non-linguistic information analysis result being a result of an analysis by the non-linguistic information analysis unit; and a filler generation unit configured to generate a filler having a length corresponding to a result of a determination by the filler length determination unit, in which the filler length determination unit determines that a long filler should be generated when a syntactic analysis result needs to be used to generate the response and determines that a short filler should be generated when the syntactic analysis result does not need to be used to generate the response, the syntactic analysis result being a result of an analysis by the syntactic analysis unit, and the voice output unit outputs the response generated by the response generation unit after outputting the filler.

Further, another exemplary aspect is a voice interaction method performed by using a voice interaction apparatus configured to have a conversation with a user by using a voice, including: acquiring user speech, the user speech being speech given by the user; performing a syntactic analysis for linguistic information on the acquired user speech; analyzing non-linguistic information for the acquired user speech, the non-linguistic information being different from the linguistic information and including at least one of prosodic information on the user speech and history information about a response generated by the voice interaction apparatus; determining whether or not a syntactic analysis result needs to be used to generate the response according to a non-linguistic information analysis result, the syntactic analysis result being a result of the syntactic analysis, the non-linguistic information analysis result being a result of the analysis of the non-linguistic information; generating and outputting a long filler when it is determined that the syntactic analysis result needs to be used to generate the response, and generating and outputting a short filler when it is determined that the syntactic analysis result does not need to be used to generate the response; and outputting the response generated according to the user speech after outputting the filler.

By the above-described configuration, the present disclosure determines whether or not the syntactic analysis result needs to be used to generate the response by using a result of the non-linguistic information analysis for user speech that takes a shorter time than that for the syntactic analysis for the user speech. Further, it is possible to output a long filler when the syntactic analysis result needs to be used to generate the response and output a short filler when the syntactic analysis result does not need to be used to generate the response. Therefore, the present disclosure can adjust the length of a filler that is output between user speech and a response thereto according to the user speech. Accordingly, it is possible to realize a more natural conversation between the voice interaction apparatus and a user.

Further, preferably, the filler length determination unit determines whether or not the acquired user speech is a question put to the voice interaction apparatus. Then, when the filler length determination unit determines that the acquired user speech is a question put to the voice interaction apparatus, the filler length determination unit determines that a long filler should be generated; the voice output unit outputs the long filler generated by the filler generation unit; the response generation unit generates an answer to the question as the response by using the syntactic analysis result; and the output unit outputs the generated answer.

When user speech is a question put to the voice interaction apparatus, it is necessary to use the syntactic analysis result to generate an answer to the question as the response. By the above-described configuration, in the present disclosure, when an answer to a question is generated as a response, a long filler is output before the completion of a syntactic analysis, thus making it possible to prevent an unnecessary pause from being caused during a conversation.

Further, preferably, the filler length determination unit determines whether or not the acquired user speech is a question put to the voice interaction apparatus. Then, when the filler length determination unit determines that the acquired user speech is not a question put to the voice interaction apparatus, the filler length determination unit determines that a short filler should be generated; the voice output unit outputs the short filler generated by the filler generation unit; the response generation unit generates a response for guiding the conversation to a different topic without using the syntactic analysis result; and the output unit outputs the generated response.

When user speech is not a question put to the voice interaction apparatus, the syntactic analysis result does not need to be used to generate a response for guiding the conversation (i.e., guiding the user) to a different topic. By the above-described configuration, in the present disclosure, when the syntactic analysis result does not need to be used and hence the generation of a response does not take a long time, a short filler is output. As a result, it is possible to prevent an unnecessarily long filler from being output and thereby prevent a user from being kept waiting. That is, it is possible to output a response immediately.

Further, the filler length determination unit preferably determines the length of the filler output by the voice output unit based on a comparison between at least one feature quantity included in the non-linguistic information analysis result and a predetermined threshold corresponding to the feature quantity.

By the above-described configuration, the present disclosure can easily adjust the length of a filler that is output between user speech and a response thereto.

Further, the filler length determination unit preferably determines the length of the filler by determining whether or not a feature indicated in the non-linguistic information analysis result corresponds to a necessity to use the syntactic analysis result to generate the response by using a determination model (or a decision model) that is generated in advance through mechanical learning.

By the above-described configuration, in the present disclosure, it is possible to adjust the length of a filler that is output between user speech and a response thereto more accurately.

According to the present disclosure, it is possible to provide a voice interaction apparatus and a voice interaction method capable of realizing a natural conversation according to user speech.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF DRAWINGS

FIG. 3 shows an example of a feature vector generated by a non-linguistic information analysis unit according to the first embodiment;

FIG. 5 shows an example of a conversation held between the voice interaction apparatus according to the first embodiment and a user;

FIG. 13 shows an example of a feature vector assigned to a sample;

FIG. 17 is a diagram for explaining a method for classifying feature vectors by using the decision trees (the determination model) shown in FIG. 14.

DESCRIPTION OF EMBODIMENTS

First Embodiment

Embodiments according to the present disclosure are hereinafter explained with reference to the drawings. Note that the same symbols are assigned to the same components throughout the drawings and duplicated explanations are omitted as required.

Figure 1:
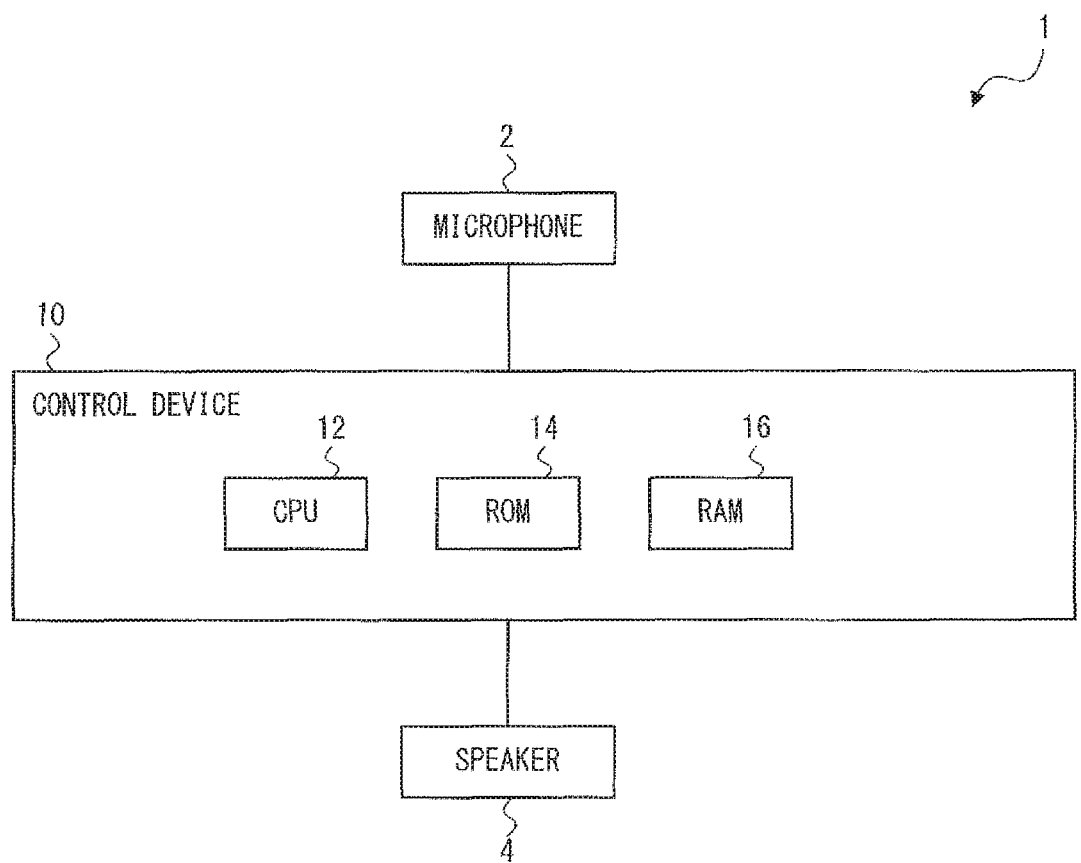
FIG. 1 shows a hardware configuration of a voice interaction apparatus according to a first embodiment.

FIG. 1 shows a hardware configuration of a voice interaction apparatus 1 according to a first embodiment. The voice interaction apparatus 1 performs a conversation with a user by using a voice. Specifically, the voice interaction apparatus 1 performs a conversation with a user by outputting a voice for the user according to speech given by the user (i.e., according to user speech). The voice interaction apparatus 1 can be installed in, for example, a robot such as a livelihood support robot and a compact robot, a cloud system, a smart phone, and so on.

The voice interaction apparatus 1 includes a microphone 2 that collects surrounding sounds, a speaker 4 that produces a voice, and a control device 10. Note that the voice interaction apparatus 1 may include an image pickup device such as a camera. The control device 10 has, for example, a function as a computer. The control device 10 is connected to the microphone 2 and the speaker 4 wirelessly or through a wire.

The control device 10 includes, as main hardware components, a CPU (Central Processing Unit) 12, a ROM (Read Only Memory) 14, and a RAM (Random Access Memory) 16. The CPU 12 has a function as an arithmetic unit that performs a control process, an arithmetic process, and the like. The ROM 14 has a function of storing a control program, an arithmetic program, and the like executed by the CPU 12. The RAM 16 has a function of temporarily storing processing data and the like.

The control device 10 analyzes user speech collected by the microphone 2 and generates a response for the user according to the user speech. Then, the control device 10 outputs a voice (a response voice) corresponding to the generated response through the speaker 4. Further, the control device 10 generates a filler that is unrelated to the content of a conversation and outputs the generated filler through the speaker 4. Note that as described previously, the filler is a voice of a meaningless hesitation or a faltering expression such as "Uh", "Well", "Umm", "Let's see", "I mean", etc. The voice interaction apparatus 1 may output this filler between when a user utters a voice and when the voice interaction apparatus makes a response thereto. Further, in this embodiment, the control device 10 is configured to adjust the length of a filler according to a result of an analysis of user speech. Details will be described later.

Figure 2:
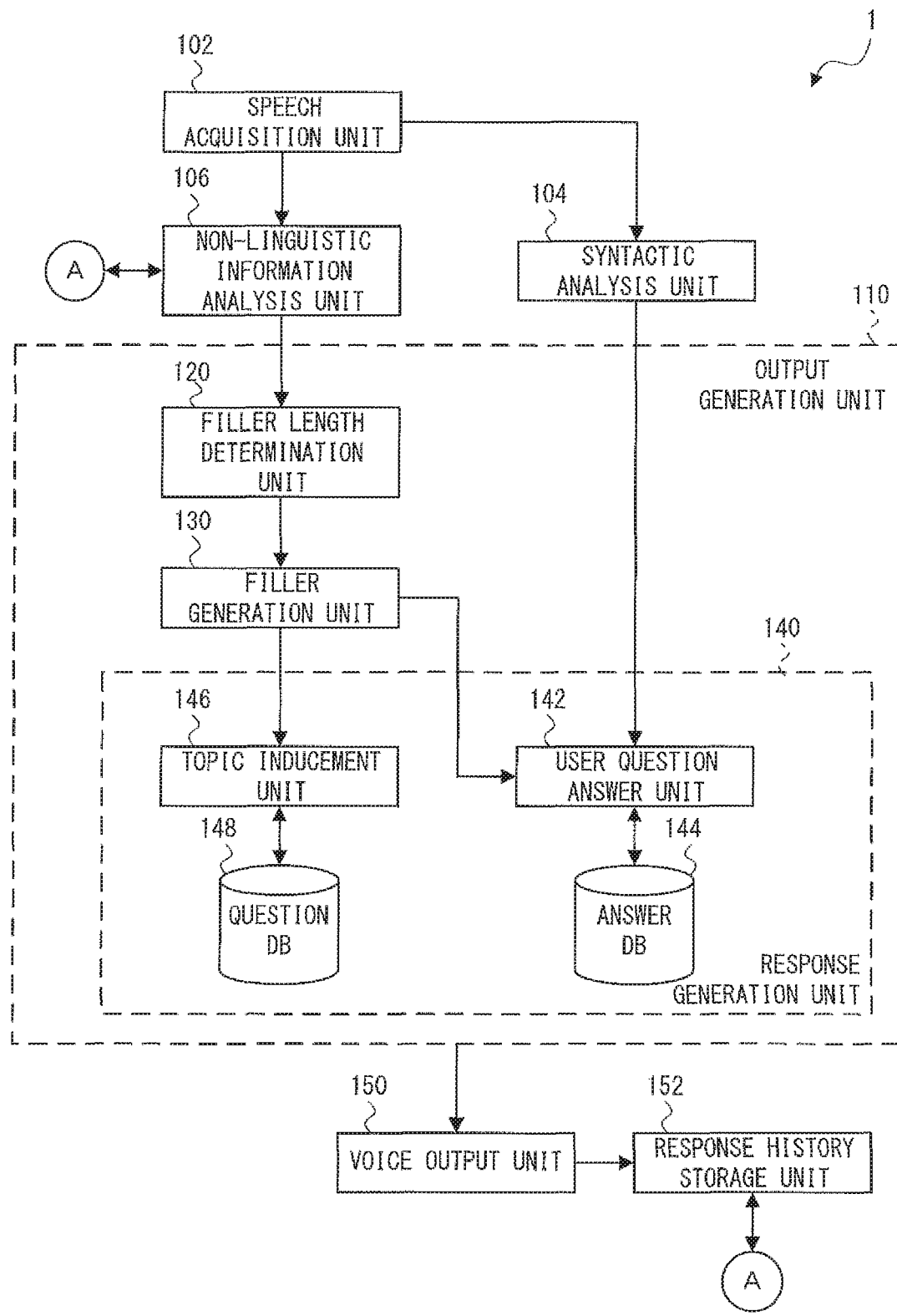
FIG. 2 is a block diagram showing a configuration of the voice interaction apparatus according to the first embodiment.

FIG. 2 is a block diagram showing a configuration of the voice interaction apparatus 1 according to the first embodiment. The voice interaction apparatus 1 includes a speech acquisition unit 102, a syntactic analysis unit 104, a non-linguistic information analysis unit 106, an output generation unit 110, a voice output unit 150, and a response history storage unit 152. Further, the output generation unit 110 includes a filler length determination unit 120, a filler generation unit 130, and a response generation unit 140. Further, the response generation unit 140 includes a user question answer unit 142, an answer database 144 (an answer DB; Database), a topic inducement unit 146, and a question database 148 (a question DB).

Each of the components shown in FIG. 2 can be implemented by at least one of the microphone 2, the speaker 4, and the control device 10. Further, at least one of the components can be implemented by having the CPU 12 execute a program stored in the ROM 14. Further, a necessary program may be stored in an arbitrary nonvolatile recording medium and may be installed as required. Note that the implementation of each component is not limited to software implementation. That is, each component may be implemented by hardware such as some kind of a circuit element.

The speech acquisition unit 102 may include the microphone 2. The speech acquisition unit 102 acquires user speech. Specifically, the speech acquisition unit 102 collects user speech and converts it into a digital signal. Then, the speech acquisition unit 102 outputs voice data of the user speech (speech voice data) to the syntactic analysis unit 104 and the non-linguistic information analysis unit 106.

The syntactic analysis unit 104 performs a syntactic analysis for linguistic information on the user speech. Further, the syntactic analysis unit 104 generates a syntactic analysis result, i.e., a result of the syntactic analysis. Then, the syntactic analysis unit 104 outputs the syntactic analysis result to the output generation unit 110. Note that the linguistic information means information indicating a character string constituting the user speech.

Specifically, the syntactic analysis unit 104 performs natural language processing for speech voice data indicating user speech by using pattern recognition or the like. More specifically, the syntactic analysis unit 104 performs a syntactic analysis including a voice recognition process and a morphological analysis or the like for the speech voice data. In this way, the syntactic analysis unit 104 can recognize the linguistic content of the user speech. For example, when user speech is "Have you ever been to Kyoto?", the syntactic analysis unit 104 recognizes a character string "Have you ever been to Kyoto?" and may recognize the content of the user speech which means that the user is asking whether or not "you" (i.e., a robot or the like in which the voice interaction apparatus 1 is installed) have ever visited a place called "Kyoto".

The non-linguistic information analysis unit 106 analyzes non-linguistic information that is different from the linguistic information for the user speech. Further, the non-linguistic information analysis unit 106 generates a feature vector (which will be described later) as a result of a non-linguistic information analysis, i.e., a result of an analysis of the non-linguistic information. Then, the non-linguistic information analysis unit 106 outputs the non-linguistic information analysis result (i.e., the feature vector) to the filler length determination unit 120 of the output generation unit 110.

Note that the non-linguistic information is information that is different from the linguistic information (the character string) of user speech to be processed and includes at least one of prosodic information (or rhythm information) on the user speech and response history information. The prosodic information is information indicating features of a voice waveform of user speech such as a fundamental frequency, a sound pressure, a variation in frequency or the like, a band of variations, a maximum amplitude, an average amplitude, and so on. Further, the response history information is information indicating a past history of responses (response voice data) generated by the response generation unit 140 and output by the voice output unit 150. The response history storage unit 152 stores (updates) this response history information when a response (response voice data) is output by the voice output unit 150.

Specifically, the non-linguistic information analysis unit 106 analyzes prosodic information based on the voice waveform by performing a voice analysis or the like for the speech voice data acquired by the speech acquisition unit 102. Then, the non-linguistic information analysis unit 106 calculates a value indicating a feature quantity indicating the prosodic information. Note that the non-linguistic information analysis unit 106 may calculate, for the speech voice data, a fundamental frequency or the like for each of frames that are obtained by dividing the speech voice data, for example, at the interval of 32 msec. Further, the non-linguistic information analysis unit 106 extracts (or reads) response history information from the response history storage unit 152 and calculates a feature quantity indicating a feature of the response history.

Note that as described above, since the syntactic analysis uses pattern recognition or the like, it often requires a very long time to do this analysis. In contrast to this, the amount of data used for the analysis of the non-linguistic information (i.e., the analysis of the prosodic information and the analysis of the response history information) is smaller than that for the syntactic analysis and its calculation technique is simpler than that for the syntactic analysis. Therefore, the time required for the analysis of the non-linguistic information may be much shorter than the time required for the syntactic analysis.

The output generation unit 110 generates voice data indicating a voice that is output for a user by using a syntactic analysis result or a non-linguistic information analysis result. Specifically, the output generation unit 110 may generate response voice data indicating a response for the user from the syntactic analysis result. Further, the output generation unit 110 may generate a filler (filler voice data indicating a filler) from the non-linguistic information analysis result. Then, the output generation unit 110 outputs the response voice data or the filler voice data to the voice output unit 150.

Note that the response is a voice that is produced according to user speech and includes, for example, a "short response" (i.e., a response consisting of one word or a few words such as "uh-huh", hereinafter simply referred to as a "short response"), an "attentively-listening response", a "question", and an "answer". Meanwhile, the "filler" is a voice expressing a hesitation or a faltering expression. In general, a "response" is uttered (or output) after a "filer" is uttered (or output). In other words, a "filler" is uttered as a filling-in word (i.e., a word for filling a silence in a conversation) before a "response" is uttered. The output generation unit 110 determines which type of response should be used according to, for example, a predetermined setting condition and determines specific voice data corresponding to the determined response type.

The "short response" is a voice indicating that the voice interaction apparatus is listening to user's talk and includes, for example, a voice that is unrelated to the content of the user speech such as "Yah", "Yes", "Uh-huh", and "Yeah". The "attentively-listening response" is a voice indicating that the voice interaction apparatus is listening to user's talk and may be a voice that is determined according to the content of the user speech. The attentively-listening response includes, for example, parroting (i.e., repeating user's words) for the user speech. Further, for example, if the user speech is "I will take you to Kyoto in the near future", the attentively-listening response may be "It's delightful". Further, the "question" is a voice for asking the user some question. The question includes a "probing question" and a "topic inducement" (or a "topic guidance"). The "probing question" is a voice for asking the user about further details of the user speech. For example, the "probing question" may be "Would you explain it in a more detailed manner?". Further, the "topic inducement" is a voice for guiding the user to the next topic so that the topic of the current conversation is changed. Further, the "answer" is a voice that is used when user speech is a question put to the voice interaction apparatus 1 (i.e., a robot or the like in which the voice interaction apparatus 1 is installed), and indicates an answer to that question.

Note that in this embodiment, it is assumed that the entity that provides a topic in a conversation between a user and the voice interaction apparatus 1 is the voice interaction apparatus 1. In this case, the voice interaction apparatus 1 provides a topic by using a "topic inducement" response. Note that the "topic inducement" is a voice that is unrelated to the immediately-preceding user speech. Therefore, the "topic inducement" may be generated without analyzing the content of the user speech by performing a syntactic analysis. Meanwhile, the "answer" is an answer to a question in user speech. Therefore, the "answer" cannot be generated unless the content of the user speech is analyzed by performing a syntactic analysis.

The voice output unit 150 may include the speaker 4. The voice output unit 150 converts filler voice data or response voice data received from the output generation unit 110 into an analog signal. Then, the voice output unit 150 outputs a voice (a filler or a response) corresponding to the filler voice data or the response voice data from the speaker 4. Further, the voice output unit 150 outputs the same response voice data as that output from the speaker 4 to the response history storage unit 152.

The response history storage unit 152 stores data for identifying this response voice data as response history information. Further, when the response history information includes information about a time related to a conversation, the response history storage unit 152 may measure that time and store the measured time as response history information.

FIG. 3 shows an example of a feature vector generated by the non-linguistic information analysis unit 106 according to the first embodiment. Note that the feature vector shown in FIG. 3 is merely an example. That is, other various feature vectors (e.g., a later-described feature vector shown in FIG. 13) can be used as the feature vector. Letting $v_i$ represent a feature vector for i-th user speech, n components of the feature vector is expressed as "$v_i=(v_{i1}, v_{i2}, \ldots, v_{i(m-1)}, v_{im}, v_{i(m+1)}, \ldots, v_{in})$". Note that each of i, n and m is an integer (n>m). Further, $v_{i1}$ to $v_{i(m-1)}$ correspond to a result of an analysis of prosodic information related to information on the i-th user speech. Further, $v_{i_m}$ to $v_{i_n}$ correspond to a result of an analysis of response history information. Note that $v_{i_m}$ to $v_{i_n}$ may be information itself stored in the response history storage unit 152. That is, for the response history information, the non-linguistic information analysis unit 106 may just extract (or read) response history from the response history storage unit 152 and may not perform any special analysis.

In the example shown in FIG. 3, $v_{i1}$ represents a parameter for a fundamental frequency f0 (f0$_T$) in T msec at the end of a phrase (hereinafter referred to as the "phrase end") of the i-th user speech (a period between T msec (T milliseconds) before the end of the user speech and the end of the user speech). Further, $v_{i5}$ represents a length L1 [sec] of the i-th user speech (a user speech length). Note that the fundamental frequency f0 may be calculated for each frame by using logic of SWIPE (Saw-tooth Waveform Inspired Pitch Estimation) of SPTK (Speech Signal Processing Toolkit).

Further, $v_{i_m}$ represents a duration D1 [sec] of the same topic (i.e., a duration of one topic) (a topic duration). The topic duration D1 is a time elapsed from when a question (a response) corresponding to a "topic inducement" (a response) is output from the voice output unit 150 the last time. Further, $v_{i(m+1)}$ represents a type of an immediately-preceding response. The type of the immediately-preceding response is a type of an immediately-preceding response output from the voice output unit 150 (i.e., a response output just before the i-th user speech) (and is one of a "short response", an "attentively-listening response", a "question", and an "answer"). Further, $v_{i(m+2)}$ represents a type of a newest question. The type of the newest question is a type of a "question" (a response) output from the voice output unit 150 the last time (and is one of a "probing question" and a "topic inducement").

Note that for each of component values (feature quantities) of components that are not numerical values such as $v_{i(m+1)}$ and $v_{i(m+2)}$, a numerical value is assigned for each type. For example, for $v_{i(m+1)}$, a component value "0" indicates a "short response" and a component value "1" indicates an "attentively-listening response". Further, a component value "2" indicates a "question" and component value "3" indicates an "answer". Further, for Vi(m+2), a component value "0" indicates a "probing question" and a component value "1" indicates a "topic inducement".

Next, a configuration of the output generation unit 110 (FIG. 2) is explained. Note that the components of the output generation unit 110 shown in FIG. 2 are those for a case where a filler is generated. However, a filler does not necessarily have to be generated for every user speech. When no filler is generated, the output generation unit 110 generates response voice data from a syntactic analysis result as descried above.

The filler length determination unit 120 determines the length of a filler (hereinafter referred to as a "filer length") output from the voice output unit 150 according to the non-linguistic information analysis result. That is, the filler length determination unit 120 adjusts the filler length according to the non-linguistic information analysis result. Note that the filler length determination unit 120 determines whether or not a syntactic analysis result needs to be used to generate a response based on the non-linguistic information analysis result. Then, when the syntactic analysis result needs to be used to generate the response, the filler length determination unit 120 determines that a long filler should be generated. On the other hand, when the syntactic analysis result does not need to be used to generate the response, the filler length determination unit 120 determines that a short filler should be generated. The filler length determination unit 120 outputs this determination result (a "long filler" generation instruction or a "short filler" generation instruction) to the filler generation unit 130. Note that a specific example of the determination method that the filler length determination unit 120 performs by using the non-linguistic information analysis result will be explained in later-described other embodiments. For example, the determination method performed by the filler length determination unit 120 may be performed by using a predefined determination formula or using a determination model that is generated in advance through machine learning.

Note that in this embodiment, the response which the syntactic analysis result needs to be used to generate is a response in a case where the response type is an "answer". That is, the case where the syntactic analysis result needs to be used is a case where the user speech indicates a question put to the other party (i.e., to the voice interaction apparatus 1). Further, the response which the syntactic analysis result does not need to be used to generate is a response in a case where the response type is a "question" and the question type is a "topic inducement". That is, the case where the syntactic analysis result does not need to be used is a case where the user speech does not indicate a question put to the other party (i.e., to the voice interaction apparatus 1). However, the above-described configuration is merely an example. That is, the response which the syntactic analysis result needs to be used to generate and the response which the syntactic analysis result does not need to be used to generate may be changed as appropriate depending on the situation of the user speech, the setting condition of the output generation unit 110, or the like.

The filler generation unit 130 generates a filler having a length that is determined according to the determination result obtained by the filler length determination unit 120. That is, the filler generation unit 130 generates filler voice data indicating a long filler or a short filler according to the determination result obtained by the filler length determination unit 120. Specifically, the filler generation unit 130 may select a long filler or a short filler from a database in which long fillers and short fillers are stored in advance in a random manner. Then, the filler generation unit 130 outputs the generated filler (i.e., the filler voice data) to the voice output unit 150. In this way, a filler having a length that is determined according to the determination result obtained by the filler length determination unit 120 is output. Examples of the long filler include a voice "Well, you have asked me a question, haven't you?". Further, examples of the short filler include a voice "Well".

Further, when the filler generation unit 130 generates a long filler, it outputs a long filler output end signal indicating that the output of a long filler is finished to the user question answer unit 142. Further, when the filler generation unit 130 generates a short filler, it outputs a short filler output end signal indicating that the output of a short filler is finished to the topic inducement unit 146.

Note that the filler generation unit 130 generates a filler before the syntactic analysis unit 104 finishes the syntactic analysis. Further, the voice output unit 150 outputs the filler before the syntactic analysis unit 104 finishes the syntactic analysis. Therefore, the filler generated by the filler generation unit 130 may be a filler that is unrelated to the content of the user speech.

The response generation unit 140 generates a response (i.e., response voice data) that is output by the voice output unit 150 after the filler (the filler voice data) generated by the filler generation unit 130 is output. When the user question answer unit 142 receives the long filler output end signal from the filler generation unit 130, it generates an "answer" to the "question" of the user speech. Note that the user question answer unit 142 generates the "answer" by using the syntactic analysis result obtained by the syntactic analysis unit 104. Further, the answer database 144 stores examples (or templates) of response voice data indicating "answers" in advance.

Specifically, the user question answer unit 142 determines the content of the question of the user speech by using the syntactic analysis result. The user question answer unit 142 determines answer information that eventually becomes an answer to the question. Then, the user question answer unit 142 selects (or retrieves) response voice data indicating an answer corresponding to the answer information from data stored in the answer database 144. Further, the user question answer unit 142 outputs the selected response voice data to the voice output unit 150. In this way, a voice indicating the answer to the question of the user speech is output from the voice output unit 150.

For example, when user speech is "Have you ever been to Kyoto?", the user question answer unit 142 determines information (i.e., information on whether or not a robot or the like in which the voice interaction apparatus 1 is installed has ever visited Kyoto) that eventually becomes an answer to the question of the user speech. Then, the user question answer unit 142 retrieves response voice data indicating, for example, an answer "I think I've never been there" from the answer database 144.

Note that the user question answer unit 142 may generate response voice data indicating an "answer" without using the answer database 144. Alternatively, the user question answer unit 142 may generate response voice data indicating an "answer" by using unfinished data (such as a template) stored in the answer database 144.

When the topic inducement unit 146 receives the short filler output end signal from the filler generation unit 130, it generates a "topic inducement" response for prompting the user to provide the next topic. Specifically, the topic inducement unit 146 generates response voice data indicating the "topic inducement" using the question database 148. The question database 148 stores a plurality of response voice data indicating topic inducement questions for guiding a user to a different topic (or inducing the user to move to a different topic) in advance. The topic inducement unit 146 selects a question for a response (response voice data) from the plurality of topic inducement questions stored in the question database 148 in an orderly manner or in a random manner. Then, the topic inducement unit 146 outputs the selected response voice data to the voice output unit 150. As a result, a voice indicating a topic inducement question is output from the voice output unit 150. Note that the topic inducement unit 146 may generate a "topic inducement" response without using the syntactic analysis result. Therefore, the topic inducement response may be unrelated to the content of the acquired user speech.

For example, assume that the user speech is "Uh-huh". In this case, the filler length determination unit 120 determines that a short filler should be generated based on the non-linguistic information analysis result. Therefore, after the output of the short filler (e.g., "Well" or the like) generated by the filler generation unit 130 is finished, the topic inducement unit 146 generates a "topic inducement" response that is unrelated to the user speech but prompts the user to provide the next topic, e.g., generates a "topic inducement" such as "How is your rehabilitation going?".

Note that there is a possibility that the syntactic analysis by the syntactic analysis unit 104 has not been completed yet when the topic inducement unit 146 receives the short filler output end signal from the filler generation unit 130. However, the topic inducement unit 146 generates a "topic inducement" response without using the syntactic analysis result. Therefore, when the topic inducement unit 146 generates a "topic inducement" response, the syntactic analysis by the syntactic analysis unit 104 may be terminated halfway through the process before it is completed. Further, the syntactic analysis result of the syntactic analysis unit 104 maybe discarded.

Figure 4:
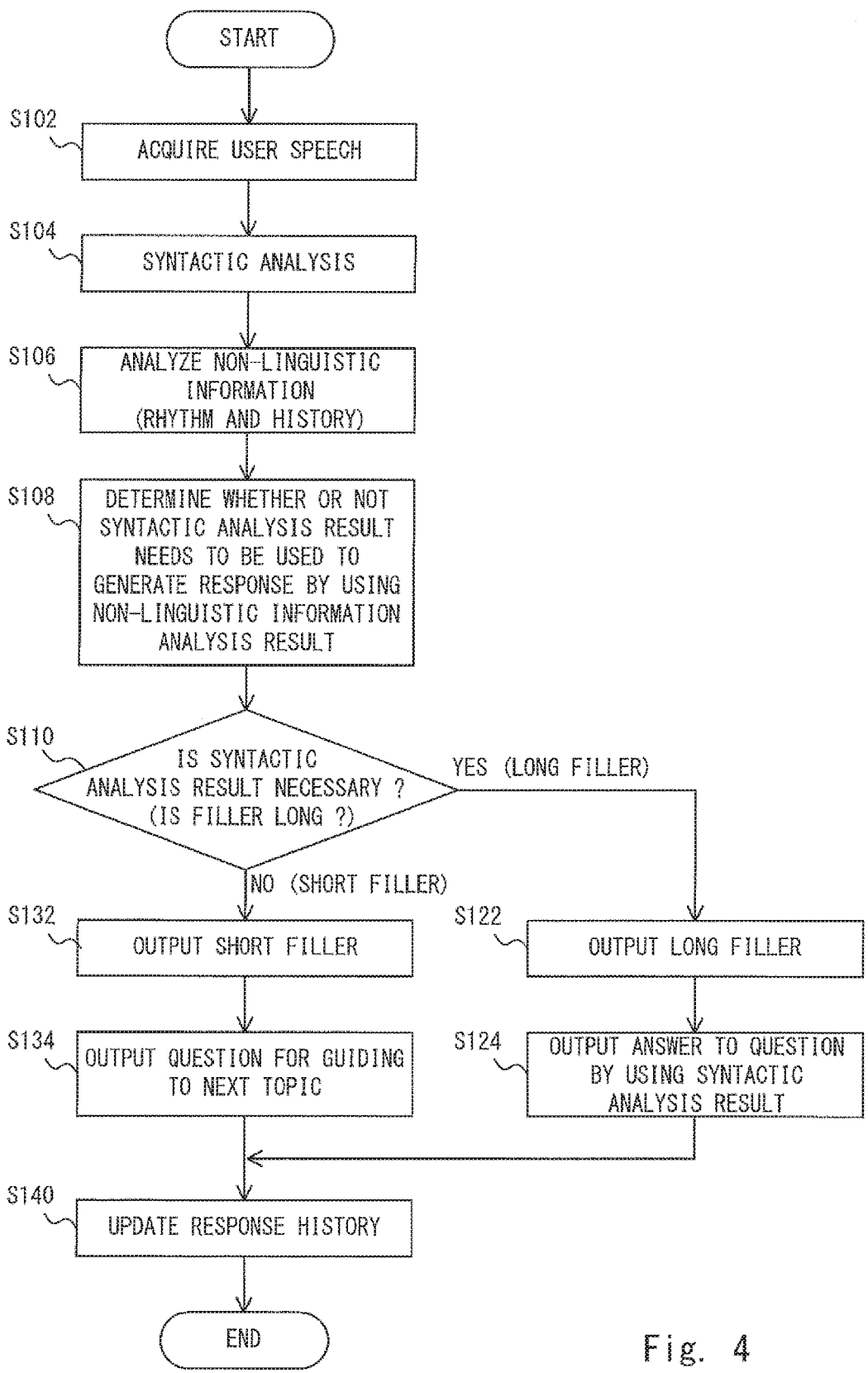
FIG. 4 is a flowchart showing a voice interaction method performed by the voice interaction apparatus according to the first embodiment.

FIG. 4 is a flowchart showing a voice interaction method performed by the voice interaction apparatus 1 according to the first embodiment. Further, FIG. 5 shows an example of a conversation held between the voice interaction apparatus 1 according to the first embodiment and a user. Note that in FIG. 5, speeches having odd speech numbers are speeches (voices) output by the voice interaction apparatus 1 and speeches having even speech numbers are speeches (voices) uttered by the user. Further, in the example shown in FIG. 5, it is assumed that the voice interaction apparatus 1 generates fillers in the speeches having speech Nos. 5 and 9.

Firstly, the speech acquisition unit 102 acquires user speech as described above (step S102). Then, as described above, the syntactic analysis unit 104 performs a syntactic analysis for the acquired user speech (step S104) and the non-linguistic information analysis unit 106 analyzes non-linguistic information (prosodic information and response history information) for the acquired user speech (step S106). Note that the processes in the steps S104 and S106 may be performed in parallel. Further, the timing at which the process in the step S104 starts may be the same as the timing at which the process in the step S106 starts. Alternatively, the process in the step S106 may start before the process in the step S104 starts. Further, the process in the step S106 is completed before the process in the next step S108 starts. In contrast to this, the process in the step S104 does not necessarily have to be completed even when a later-described process in a step S122 (or a step S132) starts.

When the process in the step S106 (i.e., the process for analyzing the non-linguistic information) is completed, the filler length determination unit 120 determines the length of the filler output from the voice output unit 150 by using the non-linguistic information analysis result as described above. That is, the filler length determination unit 120 determines whether or not the syntactic analysis result needs to be used to generate a response for the user speech by using the non-linguistic information analysis result (step S108).

Note that as described previously, in this embodiment, the case where the syntactic analysis result needs to be used to generate a response for user speech is a case where the user speech indicates a question put to the other party (i.e., to the voice interaction apparatus 1). Therefore, the filler length determination unit 120 determines whether or not the user speech indicates a question, i.e., whether or not the user has asked the voice interaction apparatus 1 a question by using the non-linguistic information analysis result. Accordingly, the filler length determination unit 120 determines whether or not the user speech includes a feature that would be present in the user speech when the user has asked a question by using the non-linguistic information analysis result.

Then, when the syntactic analysis result needs to be used to generate the response, i.e., when the user speech indicates a user's question put to the voice interaction apparatus 1, the filler length determination unit 120 determines that a long filler should be generated (Yes at step S110). On the other hand, when the syntactic analysis result does not need to be used to generate the response, i.e., when the user speech does not indicate a user's question put to the voice interaction apparatus 1, the filler length determination unit 120 determines that a short filler should be generated (No at step S110).

For example, in the conversation shown in FIG. 5, for user speech having a speech No. 2, i.e., user speech "Have you ever been to Kyoto?", the filler length determination unit 120 determines that this user speech indicates a user's question put to the voice interaction apparatus 1 by using the non-linguistic information analysis result. Therefore, the filler length determination unit 120 determines that the syntactic analysis result needs to be used to generate the response and hence determines that a long filler should be generated (Yes at step S110). Further, in the conversation shown in FIG. 5, for user speech having a speech No. 8, i.e., user speech "uh-huh", the filler length determination unit 120 determines that this user speech does not indicate a user's question put to the voice interaction apparatus 1 by using the non-linguistic information analysis result. Therefore, the filler length determination unit 120 determines that the syntactic analysis result does not need to be used to generate the response and hence determines that a short filler should be generated (No at step S110).

When it is determined that a long filler should be generated (Yes at step S110), the filler generation unit 130 generates filler voice data indicating a long filler "Well, you have asked me a question, haven't you?" (speech No. 3 in FIG. 5) and the voice output unit 150 outputs the generated long filler (step S122). Then, when the output of the long filler has been finished, the user question answer unit 142 generates response voice data indicating an answer to the question by the user speech, i.e., an answer "I think I've never been there" (speech No. 5 in FIG. 5) by using the syntactic analysis result and the voice output unit 150 outputs the generated answer to the question (step S124). Regarding speech having a speech No. 4, i.e., the speech "Yah", since it is user speech that is uttered while the long filler is being output, i.e., while the syntactic analysis is being performed, the voice interaction apparatus 1 does not have to perform any process for it at all.

On the other hand, when it is determined that a short filler should be generated (No at step S110), the filler generation unit 130 generates filler voice data indicating a short filler "Let's see" (speech No. 9-1 in FIG. 5) and the voice output unit 150 outputs the generated short filler (step S132). Then, when the output of the short filler has been finished, the topic inducement unit 146 generates response voice data indicating a question for guiding the user to (or inducing the user to move to) the next topic, i.e., a question "How is your rehabilitation going?" (speech No. 9-2 in FIG. 5) without using the syntactic analysis result and the voice output unit 150 outputs this topic inducement question (step S134).

Further, after the processes in the steps S124 and S134, the response history storage unit 152 updates the response history (step S140). Specifically, when a long filler is generated (Yes at step S110, step S122, and step S124), it means that the response type of the voice interaction apparatus 1 is an "answer". Therefore, the response history storage unit 152 records the newest response type (the speech No. 3 in the example shown in FIG. 5) as an "answer". Note that since the response type is not a "question", the question type is not updated. Further, the response history storage unit 152 continues the counting of the time for the topic duration. On the other hand, when a short filler is generated (No at step S110, step S132, step S134), it means that the response type of the voice interaction apparatus 1 is a "question". Therefore, the response history storage unit 152 records the newest response type (the speech No. 9 in the example shown in FIG. 5) as a "question". Further, since the question type is a "topic inducement", the response history storage unit 152 records the newest question type as a "topic inducement". Further, the response history storage unit 152 finishes the counting of the time for the topic duration and starts counting a new time.

When user speech indicates a question as in the case of the speech No. 2 shown in FIG. 5 and hence a response by the voice interaction apparatus 1 is an answer to that question, the voice interaction apparatus 1 needs to recognize the content of the question of the user speech to generate the answer. Therefore, the response by the voice interaction apparatus 1 needs to be generated by using the syntactic analysis result for the user speech. Accordingly, it requires a long time T1 after the user utters the speech before the voice interaction apparatus 1 responds thereto.

In contrast to this, when user speech is not a question as in the case of the speech No. 8 shown in FIG. 5 and hence a response by the voice interaction apparatus 1 is a topic inducement question, the voice interaction apparatus 1 does not need to recognize the content of the question of the user speech to generate the answer. Therefore, the response by the voice interaction apparatus 1 does not need to be generated by using the syntactic analysis result for the user speech. That is, the voice interaction apparatus 1 does not need to wait for the completion of the syntactic analysis to generate the response. Accordingly, a time T2 between when the user utters the speech and when the voice interaction apparatus 1 responds thereto may be shorter than the time T1.

As explained above, the voice interaction apparatus 1 according to this embodiment determines whether or not a syntactic analysis result needs to be used to generate a response by using a result of a non-linguistic information analysis for user speech that takes a shorter time than that for the syntactic analysis for the user speech. Further, the voice interaction apparatus 1 outputs a long filler when the syntactic analysis result needs to be used to generate the response, and thus making it possible to prevent an unnecessary pause from being caused during a conversation, i.e., before the syntactic analysis is completed. Further, the voice interaction apparatus 1 outputs a short filler when the syntactic analysis result does not need to be used to generate the response, and thus, when the generation of the response does not require long time, making it possible to prevent an unnecessarily long filler from being output and thereby prevent a user from being kept waiting. That is, it is possible to output a response immediately. As described above, the voice interaction apparatus 1 according to this embodiment can adjust the length of a filler that is output between user speech and a response thereto according to the user speech. As a result, it is possible to realize a more natural conversation between the voice interaction apparatus 1 and a user.

Second Embodiment

Next, a second embodiment is explained. In the second embodiment, the process performed by the filler length determination unit 120 is shown below in a more detailed manner than that in the first embodiment. Specifically, the filler length determination unit 120 according to the second embodiment determines a filler length by using a user speech length L1 ($v_{i5}$ in FIG. 3) of user speech for which a determination is made (hereinafter referred to as "user speech to be determined") included in the non-linguistic information analysis result. Note that the configuration of the voice interaction apparatus 1 according to the second embodiment is substantially similar to that of the voice interaction apparatus 1 according to the first embodiment shown in FIGS. 1 and 2 and therefore its explanation is omitted.

Figure 6:
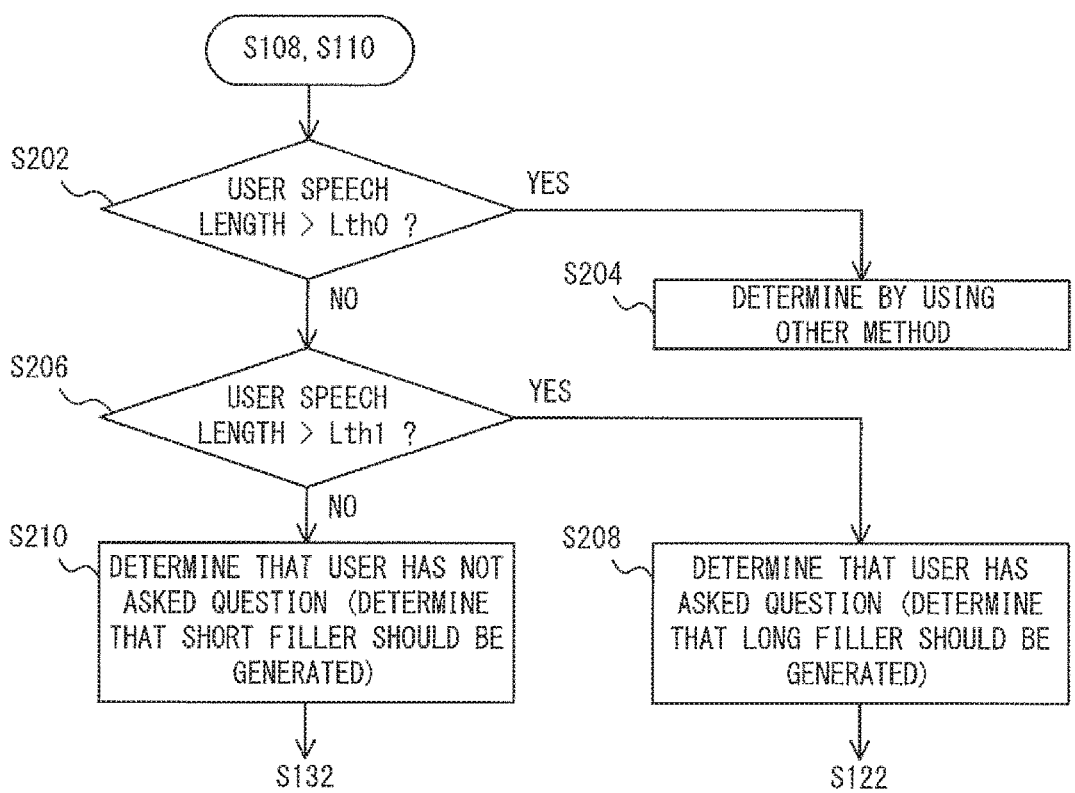
FIG. 6 is a flowchart showing processes performed by a filler length determination unit according to a second embodiment.

FIG. 6 is a flowchart showing processes performed by the filler length determination unit 120 according to the second embodiment. The flowchart shown in FIG. 6 corresponds to a specific example of the processes in the steps S108 and S110 in the flowchart shown in FIG. 4. The filler length determination unit 120 determines whether or not the user speech length L1 is longer than a predetermined threshold Lth0 (step S202). When the user speech length L1 is longer than the threshold Lth0 (Yes at step S202), the filler length determination unit 120 determines the filler length by using other methods (step S204). Note that the "other method" may be a method according to a third embodiment (which will be described later). Regarding the threshold Lth0, when the user speech length L1 exceeds this threshold Lth0, it means that it is difficult to determine whether the user speech is a question. Note that the above-described process in the step S202 is not indispensable.

On the other hand, when the user speech length L1 is equal to or shorter than the threshold Lth0 (No at step S202), the filler length determination unit 120 determines whether or not the user speech length L1 is longer than a predetermined threshold Lth1 (step S206). When the user speech length L1 is longer than the threshold Lth1 (Yes at step S206), the filler length determination unit 120 determines that the user speech indicates a question, i.e., determines that the user has asked a question. Therefore, since the syntactic analysis result is necessary to generate a response, the filler length determination unit 120 determines that a long filler should be generated (step S208). Then, the process proceeds to the step S122 in FIG. 4.

On the other hand, when the user speech length L1 is equal to or shorter than the threshold Lth1 (No at step S206), the filler length determination unit 120 determines that the user speech does not indicate a question, i.e., determines that the user has not asked a question. Therefore, since the syntactic analysis result is unnecessary to generate a response, the filler length determination unit 120 determines that a short filler should be generated (step S210). Then, the process proceeds to the step S132 in FIG. 4. Note that methods for setting the thresholds Lth0 and Lth1 are explained below with reference to FIG. 7.

Figure 7:
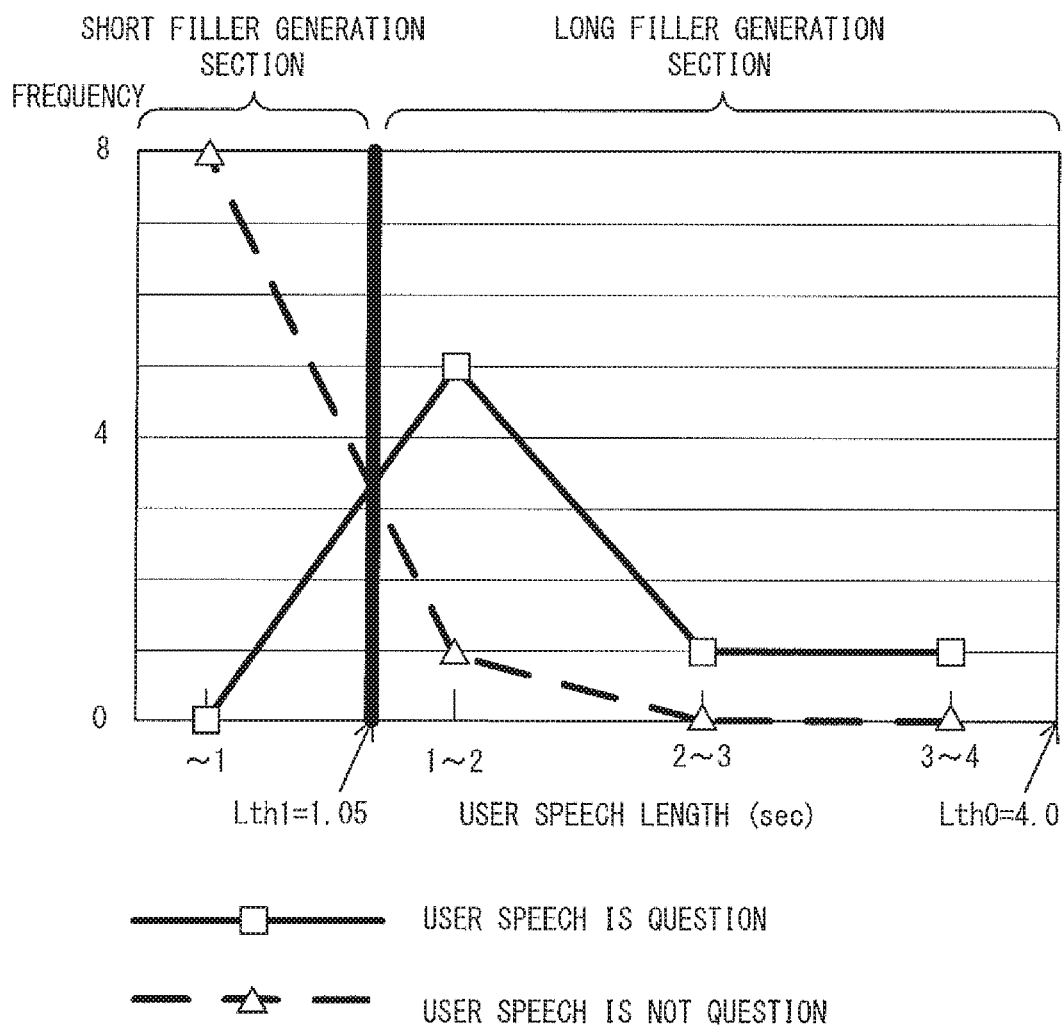
FIG. 7 is a graph showing an example of a relation between user speech lengths and frequencies of occurrences of cases where user speech is a question and occurrences of cases where the user speech is not a question.

FIG. 7 is a graph showing an example of a relation between user speech lengths and frequencies of occurrences of cases where user speech is a question and occurrences of cases where the user speech is not a question. FIG. 7 shows statistical data that is obtained by summarizing data for each of a plurality of user speeches that are extracted in advance as samples. For example, when the user speech length is shorter than 1 sec, the frequency of occurrences of cases where the user speech is a question (therefore, a long filler should be generated) is zero. Meanwhile, when the user speech length is shorter than 1 sec, the frequency of occurrences of cases where the user speech is not a question (therefore, a short filler should be generated) is eight. Therefore, in this case, since the frequency of occurrences of cases where the user speech is not a question is higher than the frequency of occurrences of cases where the user speech is a question, a short filler may be generated. As shown above, there is a tendency that when the user speech length is too short, the possibility that the user speech is a simple short response or the like and is not a question is high.

Similarly, when the user speech length is no shorter than 1 sec and shorter than 2 see, the frequency of occurrences of cases where the user speech is a question (therefore, a long filler should be generated) is five. Meanwhile, when the user speech length is no shorter than 1 sec and shorter than 2 see, the frequency of occurrences of cases where the user speech is not a question (therefore, a short filler should be generated) is one. Therefore, in this case, since the frequency of occurrences of cases where the user speech is a question is higher than the frequency of occurrences of cases where the user speech is not a question, a long filler may be generated. As shown above, there is a tendency that when the user speech length is long to some extent, the possibility that the user speech is a question is high.

As shown in FIG. 7, a boundary value of the user speech length between a short filler generation section and a long filler generation section is 1.05 sec. Therefore, the threshold Lth1 is set to 1.05 (Lth1=1.05). Further, when the user speech length exceeds 4.0, it is difficult to determine whether the user speech indicates a question. Therefore, the threshold Lth0 is set to 4.0 (Lth0=4.0). Note that the above-described threshold (the boundary value) may be changed as appropriate according to the topic (e.g., a small talk about a travel) provided by the topic inducement unit 146 of the voice interaction apparatus 1. Therefore, the voice interaction apparatus 1 may store thresholds Lth0 and Lth1 for each question stored in the question database 148. Further, the above-described thresholds may be changed according to the individual language of the speech (Japanese, English, French, etc.). Therefore, the voice interaction apparatus 1 may store thresholds Lth0 and Lth1 for each question stored in the question database 148 and for each individual language.

The voice interaction apparatus 1 according to the second embodiment also determines whether or not a syntactic analysis result needs to be used to generate a response by using a result of a non-linguistic information analysis for user speech (i.e., by using a user speech length L1) that takes a shorter time than that for the syntactic analysis for the user speech. Further, the voice interaction apparatus 1 according to the second embodiment can adjust the length of a filler that is output between user speech and a response thereto according to the user speech. Accordingly, in the second embodiment, it is also possible to realize a more natural conversation between the voice interaction apparatus 1 and a user.

Further, in the second embodiment, it is possible to determine whether or not a syntactic analysis result needs to be used to generate a response by using a predetermined simple determination formula (corresponding to the process in the step S206) and thereby to adjust the length of a filler that is output between user speech and a response thereto. That is, in the second embodiment, the filler length determination unit 120 adjusts the length of a filler based on a comparison between a feature quantity (a user speech length L1) included in the non-linguistic information analysis result and a predetermined threshold (such as a threshold Lth1) corresponding to that feature quantity. Therefore, it is possible to easily adjust the length of a filler that is output between user speech and a response thereto.

Third Embodiment

Next, a third embodiment is explained. In the third embodiment, the process performed by the filler length determination unit 120 is shown below in a more detailed manner than that in the first embodiment. Specifically, the filler length determination unit 120 according to the third embodiment determines a filler length by using a fundamental frequency $f0_{500}$ (vii in FIG. 3) in 500 msec at the phrase end of user speech to be determined included in the non-linguistic information analysis result. Note that the configuration of the voice interaction apparatus 1 according to the third embodiment is substantially similar to that of the voice interaction apparatus 1 according to the first embodiment shown in FIGS. 1 and 2 and therefore its explanation is omitted.

Figure 8:
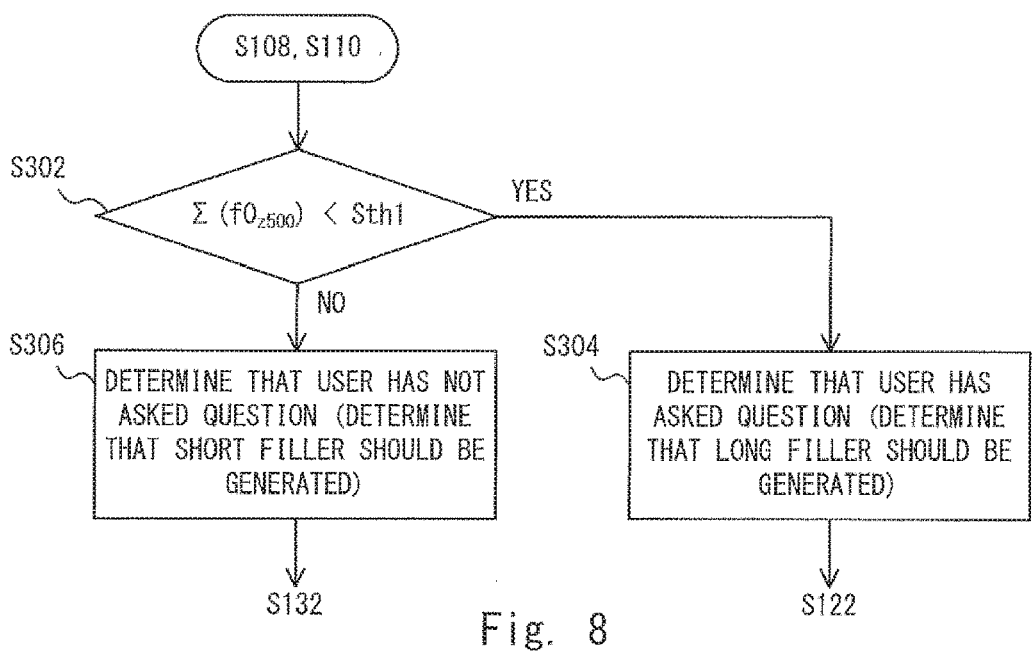
FIG. 8 is a flowchart showing processes performed by a filler length determination unit according to a third embodiment.

FIG. 8 is a flowchart showing processes performed by the filler length determination unit 120 according to the third embodiment. The flowchart shown in FIG. 8 corresponds to a specific example of the processes in the steps S108 and S110 in the flowchart shown in FIG. 4. The filler length determination unit 120 determines whether or not a standard deviation $\sigma(f0_{z500})$ of a value $f0_{z500}$ that is obtained by normalizing the fundamental frequency $f0_{500}$ in 500 msec at the phrase end of user speech is smaller than a predetermined threshold Sth1 (step S302). Specifically, the filler length determination unit 120 calculates the standard deviation $\sigma(f0_{z500})$ from the non-linguistic information analysis result (the feature vector) and compares the calculated standard deviation $\sigma(f0_{z500})$ with the threshold Sth1. Note that the calculation of the standard deviation $\sigma(f0_{z500})$ may be performed by the non-linguistic information analysis unit 106.

Note that the normalized value $f0_{z500}$ of the fundamental frequency $f0_{z500}$ is calculated by using the below-shown Expression 1. In the expression, $f0^{pre}_{z500}$ is a fundamental frequency $f0_{z500}$ of the previous speech. The "previous speech" is speech that is uttered by the user before the user speech to be determined (i.e., the user speech for which the determination is made). The "previous" may mean one minute or 10 minutes before the user speech to be determined, or may mean a previous day.

$$f0_{z500} = (f0_{z500} - \overline{f0_{500}^{pre}})/\sigma(f0_{500}^{pre}) \quad \text{(Expression 1)}$$

When the standard deviation $\sigma(f0_{z500})$ is smaller than the threshold Sth1 (Yes at step S302), the filler length determination unit 120 determines that the user speech indicates a question, i.e., determines that the user has asked a question. Therefore, since the syntactic analysis result is necessary to generate a response, the filler length determination unit 120 determines that a long filler should be generated (step S304). Then, the process proceeds to the step S122 in FIG. 4.

On the other hand, when the standard deviation $\sigma(f0_{z500})$ is equal to or larger than the threshold Sth1 (No at step S302), the filler length determination unit 120 determines that the user speech does not indicate a question, i.e., determines that the user has not asked a question. Therefore, since the syntactic analysis result is unnecessary to generate a response, the filler length determination unit 120 determines that a short filler should be generated (step S306). Then, the process proceeds to the step S132 in FIG. 4. Note that a method for setting the threshold Sth1 is explained below with reference to FIG. 9.

Figure 9:
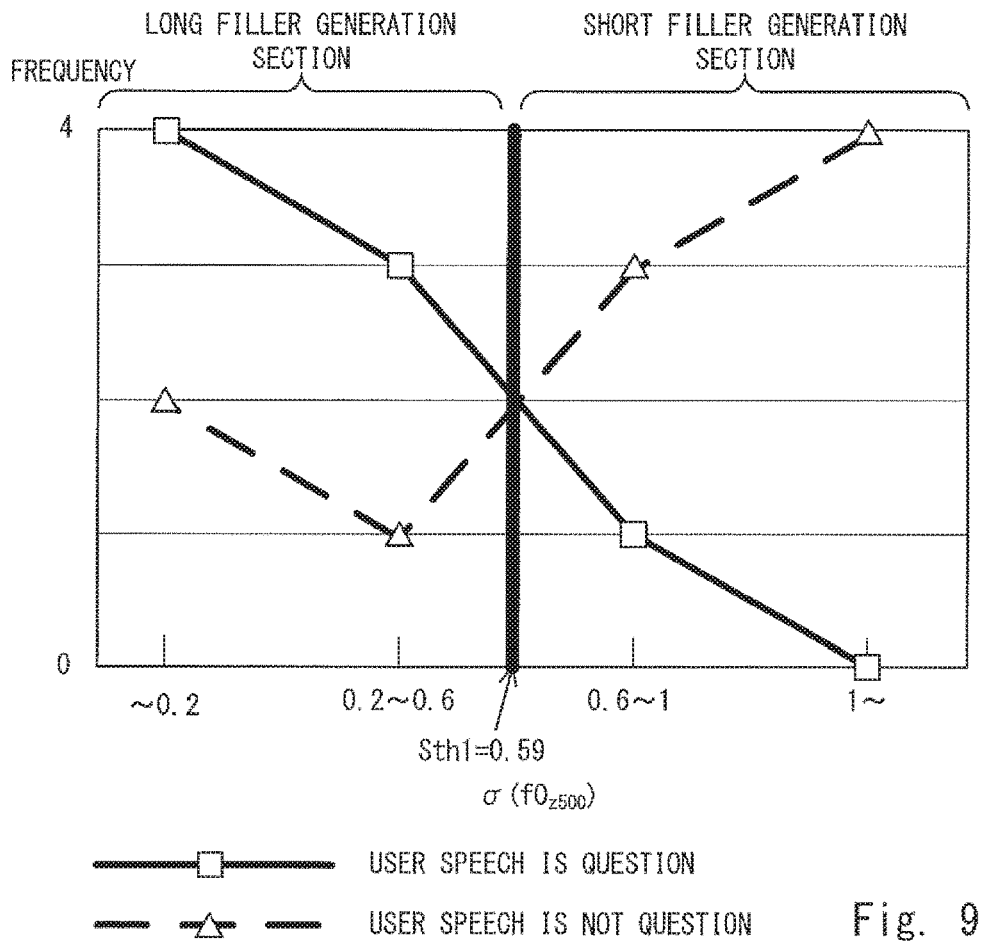
FIG. 9 is a graph showing an example of a relation between standard deviations for normalized values of fundamental frequencies in 500 msec at the phrase end of user speech and frequencies of occurrences of cases where user speech is a question and occurrences of cases where the user speech is not a question.

FIG. 9 is a graph showing an example of a relation between standard deviations $\sigma(f0_{z500})$ for normalized values $f0_{z500}$ of fundamental frequencies $f0_{500}$ in 500 msec at the phrase end of user speech and frequencies of occurrences of cases where user speech is a question and occurrences of cases where the user speech is not a question. FIG. 9 shows statistical data that is obtained by summarizing data for each of a plurality of user speeches that are extracted in advance as samples. For example, when the standard deviation $\sigma(f0_{z500})$ is smaller than 0.2, the frequency of occurrences of cases where the user speech is a question (therefore, a long filler should be generated) is four. Meanwhile, when the standard deviation $\sigma(f0_{z500})$ is smaller than 0.2, the frequency of occurrences of cases where the user speech is not a question (therefore, a short filler should be generated) is two. Therefore, in this case, since the frequency of occurrences of cases where the user speech is a question is higher than the frequency of occurrences of cases where the user speech is not a question, a long filler may be generated. As shown above, there is a tendency that when the standard deviation $\sigma(f0_{z500})$ is small, the possibility that the user speech is a question is high.

Similarly, when the standard deviation $\sigma(f0_{z500})$ is no smaller than 0.6 and smaller than 1, the frequency of occurrences of cases where the user speech is a question (therefore, a long filler should be generated) is one. Meanwhile, when the standard deviation $\sigma(f0_{z500})$ is no smaller than 0.6 and smaller than 1, the frequency of occurrences of cases where the user speech is not a question (therefore, a short filler should be generated) is three. Therefore, in this case, since the frequency of occurrences of cases where the user speech is not a question is higher than the frequency of occurrences of cases where the user speech is a question, a short filler may be generated. As shown above, there is a tendency that when the standard deviation $\sigma(f0_{z500})$ is large, the possibility that the user speech is a simple short response or the like and is not a question is high.

As shown in FIG. 9, a boundary value of the standard deviation $\sigma(f0_{z500})$ between a short filler generation section and a long filler generation section is 0.59. Therefore, the threshold Sth1 is set to 0.59 (Sth1=0.59). Note that the above-described threshold (the boundary value) may be changed as appropriate according to the topic provided by the topic inducement unit 146 of the voice interaction apparatus 1. Therefore, the voice interaction apparatus 1 may store a threshold Sth1 for each question stored in the question database 148. Further, the above-described thresholds may be changed according to the individual language of the speech (Japanese, English, French, etc.). Therefore, the voice interaction apparatus 1 may store a threshold Sth1 for each question stored in the question database 148 and for each individual language.

The voice interaction apparatus 1 according to the third embodiment also determines whether or not a syntactic analysis result needs to be used to generate a response by using a result of a non-linguistic information analysis for user speech (i.e., by using a fundamental frequency f0) that takes a shorter time than that for the syntactic analysis for the user speech. Further, the voice interaction apparatus 1 according to the third embodiment can adjust the length of a filler that is output between user speech and a response thereto according to the user speech. Accordingly, in the third embodiment, it is also possible to realize a more natural conversation between the voice interaction apparatus 1 and a user.

Further, similarly to the second embodiment, in the third embodiment, it is possible to determine whether or not a syntactic analysis result needs to be used to generate a response by using a predetermined simple determination formula (corresponding to the process in the step S302) and thereby to adjust the length of a filler that is output between user speech and a response thereto. That is, in the third embodiment, the filler length determination unit 120 adjusts the length of a filler based on a comparison between a feature quantity (a standard deviation of a fundamental frequency) included in the non-linguistic information analysis result and a predetermined threshold (such as a threshold Sth1) corresponding to that feature quantity. Therefore, it is possible to easily adjust the length of a filler that is output between user speech and a response thereto.

Fourth Embodiment

Next, a fourth embodiment is explained. In the fourth embodiment, the process performed by the filler length determination unit 120 is shown below in a more detailed manner than that in the first embodiment. Specifically, the filler length determination unit 120 according to the fourth embodiment determines a filler length by using a determination model (or a decision model) that is generated in advance through machine learning (such as a random forest). More specifically, the filler length determination unit 120 distinguishes (i.e., determines) whether or not a feature (a component of a feature vector) indicated in the non-linguistic information analysis result corresponds to a necessity to use the syntactic analysis result to generate a response (i.e., whether or not user speech is a question) by using a determination model that. In this way, the filler length determination unit 120 determines the filler length. Note that the configuration of the voice interaction apparatus 1 according to the fourth embodiment is substantially similar to that of the voice interaction apparatus 1 according to the first embodiment shown in FIGS. 1 and 2 and therefore its explanation is omitted.

Figure 10:
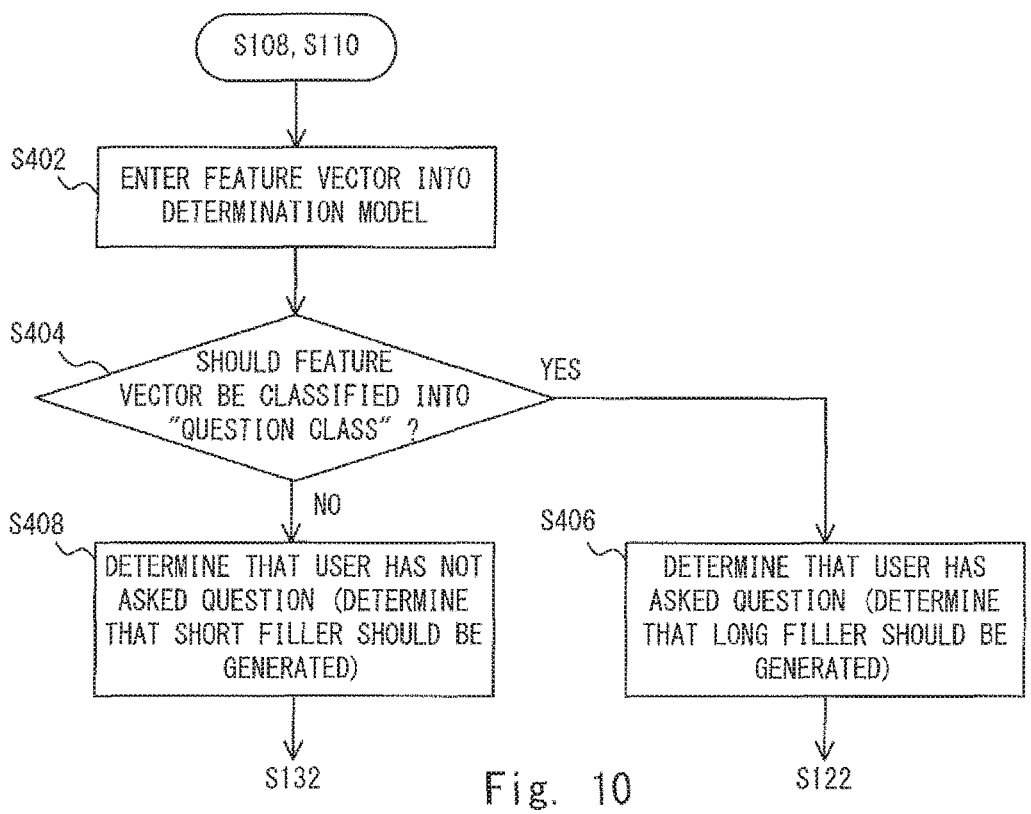
FIG. 10 is a flowchart showing processes performed by a filler length determination unit according to a fourth embodiment.

FIG. 10 is a flowchart showing processes performed by the filler length determination unit 120 according to the fourth embodiment. The flowchart shown in FIG. 10 corresponds to a specific example of the processes in the steps S108 and S110 in the flowchart shown in FIG. 4. The filler length determination unit 120 enters a feature vector v of user speech to be determined into a determination model (step S402). Note that as described above, the feature vector v corresponds to a non-linguistic information analysis result. That is, the feature vector v may be generated by the non-linguistic information analysis unit 106. Further, the determination model is formed by decision trees for determining whether or not a feature vector indicates that corresponding user speech is a question. The determination model will be described later.

The filler length determination unit 120 determines whether or not the feature vector v is classified into a "question class" (step S404). Note that the "question class" is one of classes (categories) into which a feature vector is classified based on the determination model. In this example, the classes into which feature vectors are classified based on the determination model include the "question class" and a "non-question class". The "question class" is a class for which a possibility that user speech indicates a question is high, while the "non-question class" is a class for which a possibility that user speech indicates a question is low. That is, the "question class" corresponds to a state where a feature indicated in the non-linguistic information analysis result indicates necessity of use of the syntactic analysis result to generate a response. Details will be described later.

When the feature vector v is classified into the "question class" (Yes at step S404), the filler length determination unit 120 determines that the user speech indicates a question, i.e., determines that the user has asked a question. Therefore, since the syntactic analysis result is necessary to generate a response, the filler length determination unit 120 determines that a long filler should be generated (step S406). Then, the process proceeds to the step S122 in FIG. 4.

When the feature vector v is not classified into the "question class" (No at step S404), the filler length determination unit 120 determines that the user speech does not indicate a question, i.e., determines that the user has not asked a question. Therefore, since the syntactic analysis result is unnecessary to generate a response, the filler length determination unit 120 determines that a short filler should be generated (step S408). Then, the process proceeds to the step S132 in FIG. 4.

Next, a method for generating a determination model is explained. Note that the determination model may be generated by the voice interaction apparatus 1 according to this embodiment or may be generated by an apparatus (a computer) different from the voice interaction apparatus 1.

Figure 11:
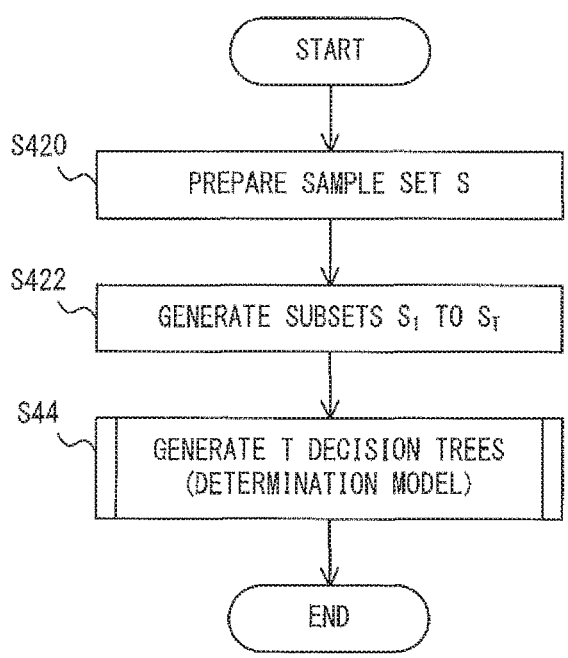
FIG. 11 is a flowchart showing a method for generating a determination model according to the fourth embodiment.

FIG. 11 is a flowchart showing a method for generating a determination model according to the fourth embodiment. Firstly, a sample set S is prepared by using a number of leaning data (step S420). Note that samples i, which are elements of the sample set S, are data corresponding to user speech prepared in advance. The number of samples is, for example, about 150. However, the number is not limited to 150. Next, T subsets $S_1$ to $S_T$ are generated by using the sample set S (step S422). The number of subsets T is, for example, about 100. However, the number is not limited to 100. Then, a decision tree (a determination model) is generated for each subset. That is, T decision trees are generated (step S44). Details are explained hereinafter with reference to the drawings.

Figure 12:
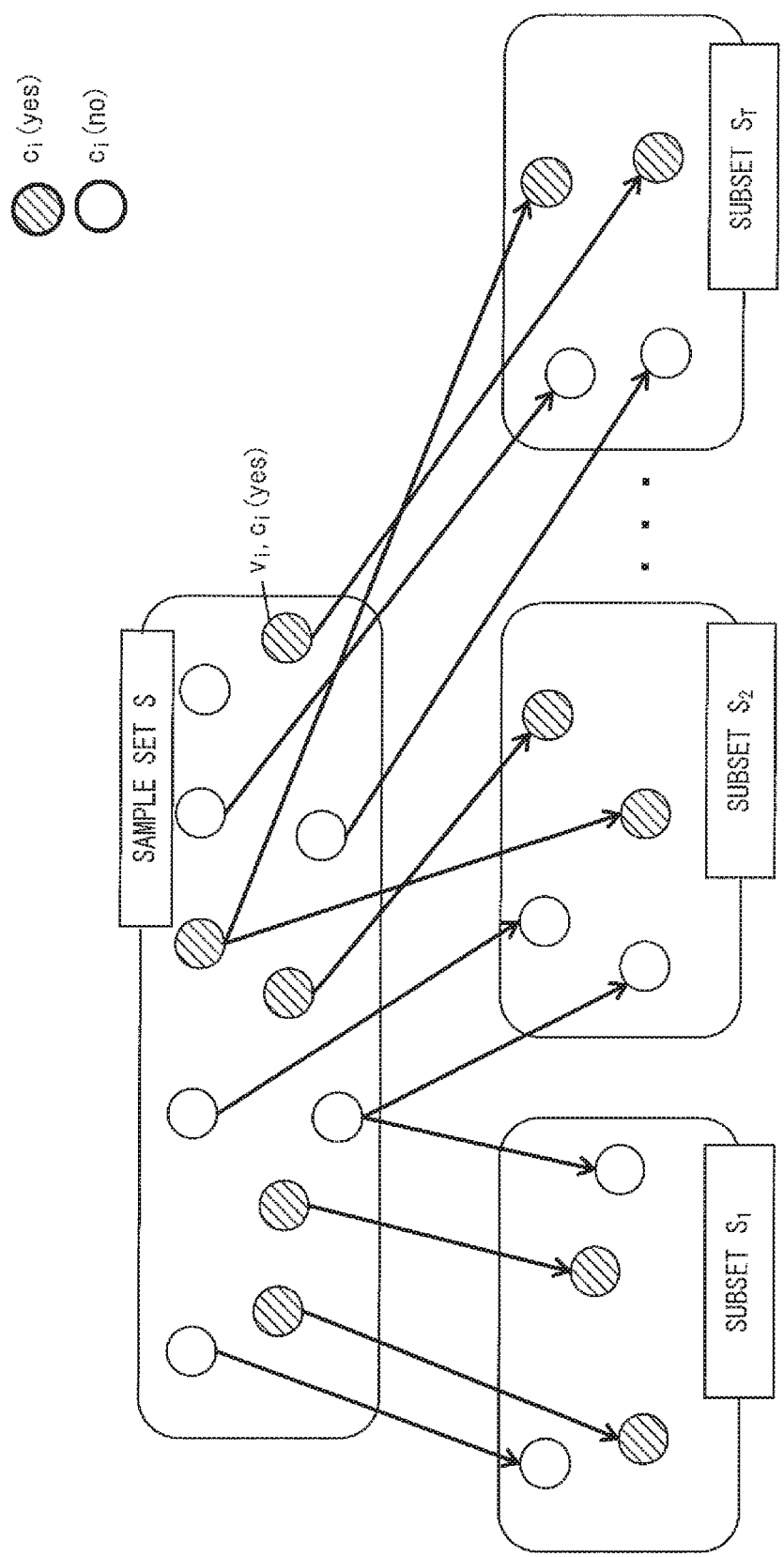
FIG. 12 shows an example of a sample set and subsets.

FIG. 12 shows an example of the sample set S and the subsets $S_1$ to $S_T$. A feature vector $v_i$ and a correct label $c_i$ are assigned to each sample i (indicated by a circuit in FIG. 12). The correct label $c_i$ indicates a "yes" when user speech corresponding to its sample i is a question put to the voice interaction apparatus 1 and indicates "no" when the user speech corresponding to its sample i is not a question put to the voice interaction apparatus 1. Note that in FIG. 12, samples i with "yes" correct labels are indicated by hatching. Further, the "question class" corresponds to the correct label $c_i$ indicating "yes" and the "non-question class" corresponds to the correct label $c_i$ indicating "no". Note that correct labels $c_i$ are assigned by having a person who makes annotations (hereinafter also referred to as an "annotator") listen to user speeches corresponding to respective samples i. That is, the annotator listens to user speech, determines which class the user speech corresponds to based linguistic information, non-linguistic information, and the like of the user speech, and assigns a correct label $c_i$ to a sample i. Note that the annotator may assign a correct label $c_i$ to a sample i by observing an image of a user who is uttering the user speech.

Each subset is created by extracting samples i from the sample set S in a random manner and assigning the extracted samples i to that subset. Note that it is assumed that each subset includes the same number of samples i as elements of that subset. The number of samples i in each subset, which are elements of that subset, is, for example, several tens (e.g., 30). Note that for clarifying the explanation, the number of samples i in each subset is four in the example shown in FIG. 12. Further, the same sample i may be included two or more subsets. Further, all the samples i in the sample set S do not necessarily have to be assigned to the subsets.

FIG. 13 shows an example of a feature vector $v_i$ assigned to a sample. Note that the feature vector shown in FIG. 13 is merely an example. That is, other various feature vectors can be used as the feature vector. The feature vector shown in FIG. 13 is a 17-dimensional vector and includes components $x_1$ to $x_{17}$. Note that values of these components $x_1$ to $x_{17}$ are obtained by normalizing feature quantities of respective components (i.e., converting into dimensionless values). The minimum value for these components is zero and the maximum value therefor is one. Note that the dimension 4 ($x_4$) "inclination of f0 in 200 msec at phrase end" corresponds to a variation in a fundamental frequency f) in 200 msec at the phrase end. Specifically, "inclination of f0 in 200 msec at phrase end" may correspond to a value that is obtained by subtracting an average value of the fundamental frequency f0 in 100 msec in the first half of 200 msec at the phrase end from an average value of the fundamental frequency f0 in 100 msec in the second half of 200 msec at the phrase end.

Figure 14:
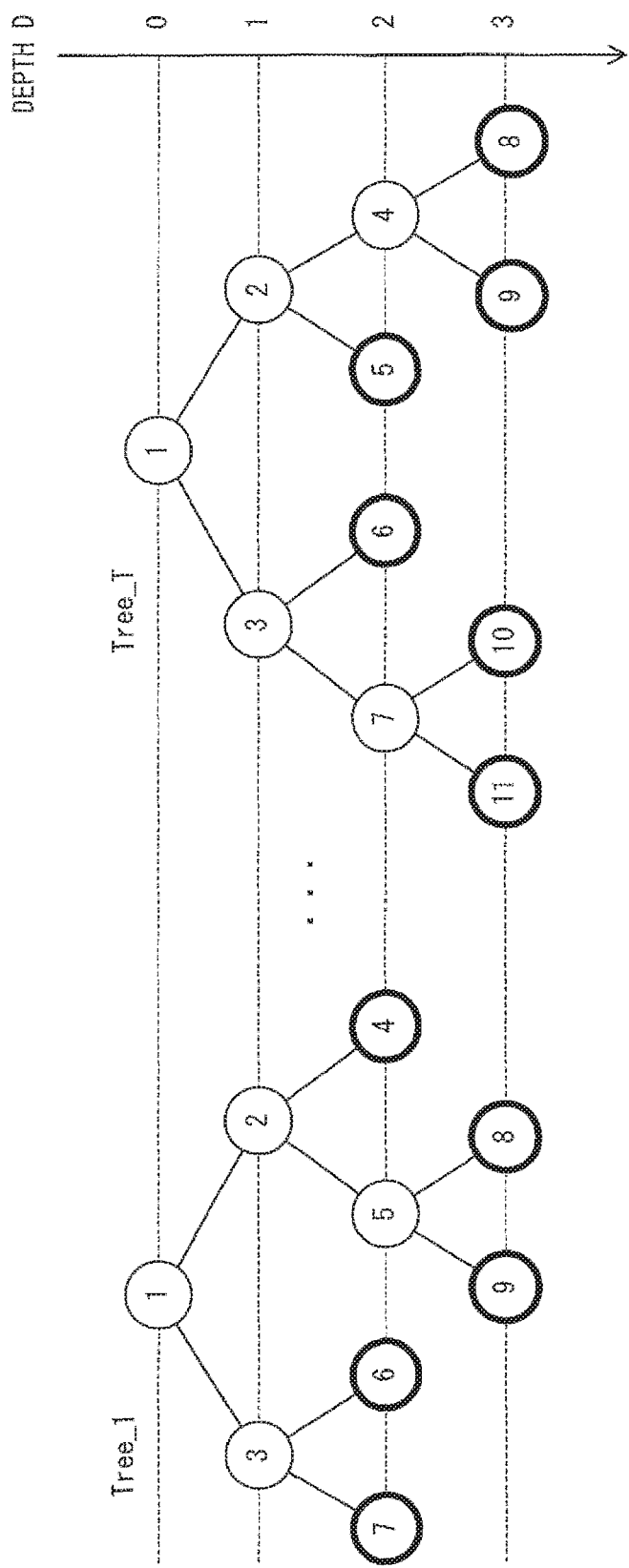
FIG. 14 shows an example of decision trees (a determination model) generated by a process in a step S44 in FIG. 11.

FIG. 14 shows an example of decision trees (a determination model) generated by a process in a step S44 in FIG. 11. In the example shown in FIG. 14, T decision trees Tree_1 to Tree_T are generated. If the depth D of a decision tree is made too deep, there is a risk of overlearning. Therefore, the depth D of decision trees shown in FIG. 14 is three at the maximum. For example, in the Tree_1, nodes 2 and 3 are in a depth 1 and nodes 4 to 7 are in a depth 2. Further, nodes 8 and 9 are a depth 3.

Further, for example, in the Tree_1, a node 1 is a root node and nodes 2 and 3, which are child nodes of the node 1, are branched from the node 1. Further, nodes 4 and 5, which are child nodes of the node 2, are branched from the node 2, and nodes 6 and 7, which are child nodes of the node 3, are branched from the node 3. Further, nodes 8 and 9, which are child nodes of the node 5, are branched from the node 5. Further, the nodes 4, 6, 7, 8 and 9 are terminal nodes (indicated by bold-line circles). When a feature vector of user speech to be determined is entered into the node 1, which is the root node, it eventually reaches one of the nodes 4, 6, 7, 8 and 9, which are the terminal nodes. Note that nodes 1, 2, 3 and 5 other than the terminal nodes are branch nodes (indicated by narrow-line circles).

Note that for each branch node, a branch function F for defining (i.e., determining) which of child nodes a feature vector should be branched is assigned. Further, for each terminal node, a possibility P that a feature vector that has reached that terminal node corresponds to a "question class" (or a "non-question class") is associated (i.e., assigned). A method for generating decision trees is explained hereinafter.

Figure 15:
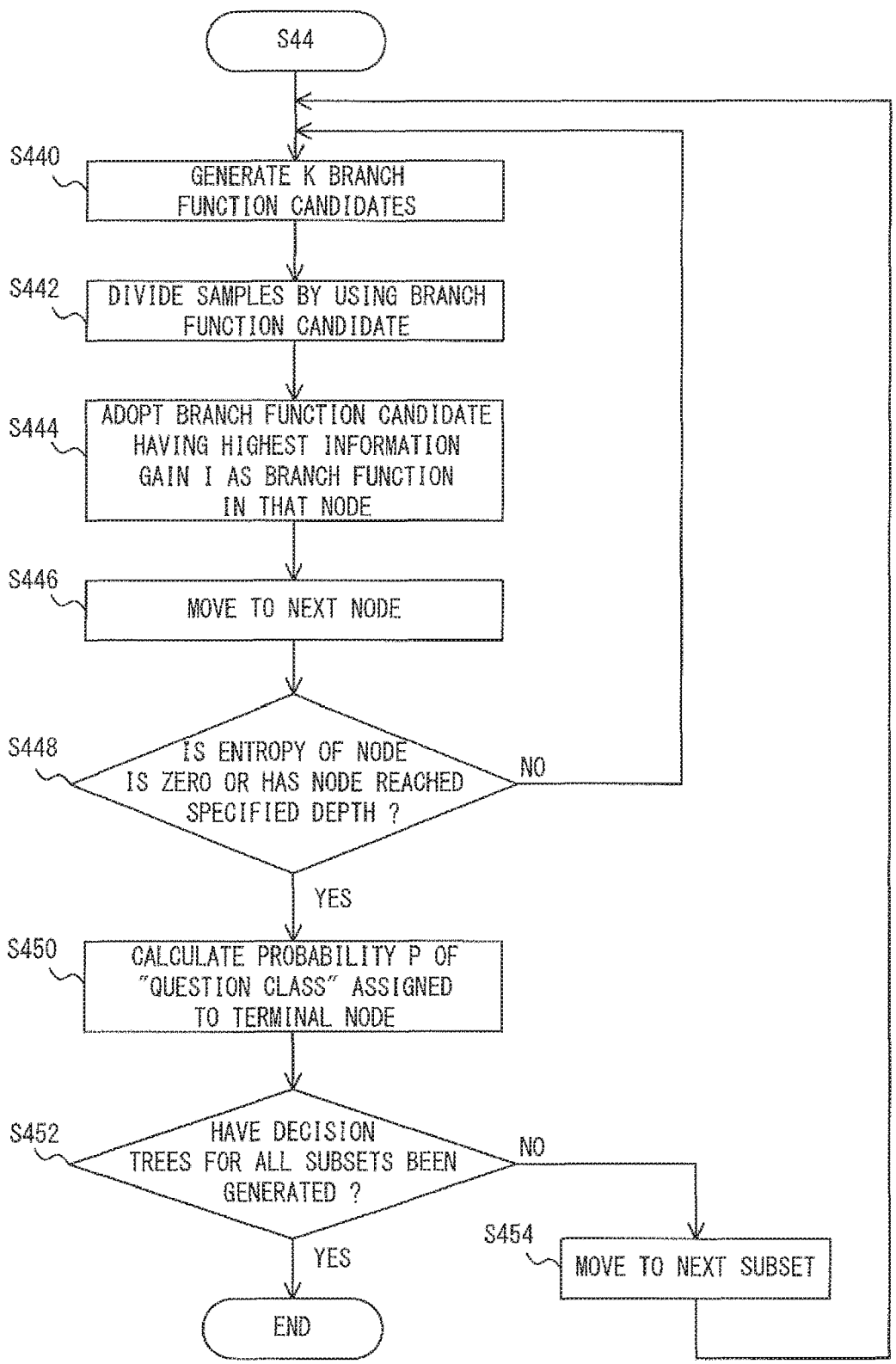
FIG. 15 is a flowchart showing a method for generating decision trees.

FIG. 15 is a flowchart showing a method for generating decision trees. Firstly, for a given branch node (e.g., a node 1, which is a root node) of a given subset (e.g., a subset $S_1$), K branch function candidates Fc ($Fc_k$; k=1 to K) are generated in a random manner (step S440). Each branch function candidate Fc is a function including at least one of the components ($x_1$ to $x_{17}$) of the feature vector shown in FIG. 13 as a parameter. Note that for each branch function candidate $Fc_k$, a threshold $t_k$ that becomes a boundary as to which of child nodes a feature vector is branched is associated (i.e., assigned). Note that the threshold $t_k$ may also be generated in a random manner. Note that the value of K may be a value equal to or close to the square root of the number of dimensions of the feature vector. Therefore, in the example shown in FIG. 13, since the number of dimensions of the feature vector is 17, the number K is four (K=4).

For example, the branch function candidate $Fc_1$ may be a function of $x_1$ and its corresponding threshold $t_1$ may be 0.4. Further, the branch function candidate $Fc_2$ may be a function of $x_3$ and its corresponding threshold t2 may be 0.3. Further, the branch function candidate $Fc_3$ may be a function of $x_5$ and its corresponding threshold $t_3$ may be 0.6. Further, the branch function candidate $Fc_4$ may be a function of $x_{17}$ and its corresponding threshold t4 may be 0.4.

Next, samples i are divided by using respective branch function candidates Fc (step S442). Specifically, by using the below-shown Expression 2, samples i of a sample set $S_j$ of the node before the branching (i.e., the parent node) are divided into a sample set $S_L$ at a child node on the left side or a sample set $S_R$ at a child node on the right side.

$$S_L = \{i \in S_j | Fc_k(v_i) < t_k\}$$

$$S_r = S_j \backslash S_L, \text{ where "\textbackslash" is division operator} \quad \text{(Expression 2)}$$

Next, a branch function candidate Fc having the highest information gain I is adopted as a branch function F in that node (step S444). Specifically, firstly, information gain I expressed by the below-shown Expression 3 is calculated for each branch function candidate Fc.

$$I = H(S_j) - \frac{|S_L|}{|S_j|} H(S_L) - \frac{|S_R|}{|S_j|} H(S_R) \quad \text{(Expression 3)}$$

In the expression, H(S) is entropy of a set S defined by the below-shown Expression 4. Note that C is the number of classes. In the above-described example, the number C is two (C=2). Further, it is assumed that "c=1" corresponds to a "question class" and "c=2" corresponds to a "non-question class". Further, in the below-shown expression, $P_c$ is an appearance probability of a class c in the set S. Further, the entropy H(S) indicates a bias of an appearance probability of each class in the set S. When the bias of an appearance probability of each class is small, the entropy increases.

$$H(S) = -\Sigma_{c=1}^{C} P_c \log_2 P_c \quad \text{(Expression 4)}$$

Figure 16:
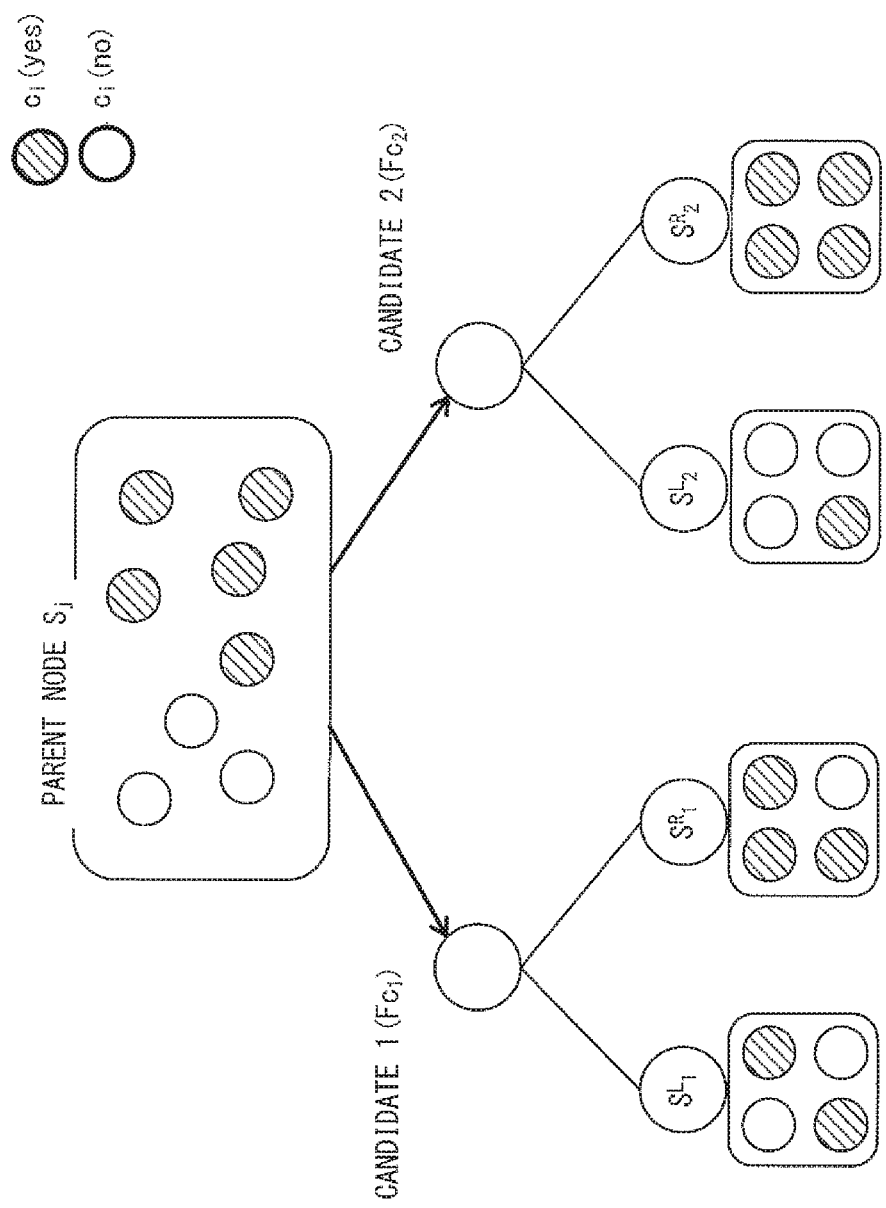
FIG. 16 shows an example of a set that is divided into two subsets for two respective branch function candidates.

FIG. 16 shows an example of a set that is divided into two subsets for two respective branch function candidates Fc. In the example explained below, for clarifying the explanation, it is assumed that the number of branch function candidates Fc is two. Samples of a set $S_j$ at the parent node are divided into a set $S^L_1$ and a set $S^R_1$ by a branch function candidate $Fc_1$ (a candidate 1). Further, the samples of the set $S_j$ at the parent node are divided into a set $S^L_2$ and a set $S^R_2$ by a branch function candidate $Fc_2$ (a candidate 2). In the example shown in FIG. 16, eight samples of the set $S_j$ at the parent node are divided into two subsets each of which includes four samples by respective branch function candidates Fc.

In this case, the entropy $H(S_j)$ of the set $S_j$ at the parent node is calculated as shown by the below-shown Expression 5 by using the above-shown Expression 4.

$$H(S_j) = -\frac{5}{8}\log_2\frac{5}{8} - \frac{3}{8}\log_2\frac{3}{8} = 0.954 \quad \text{(Expression 5)}$$

Further, the entropies of the divided sets $S^L_1$ and $S^R_1$ for the candidate 1 are calculated as shown by the below-shown Expression 6 by using the above-shown Expression 4.

$$H(S^L_1) = -\frac{2}{4}\log_2\frac{2}{4} - \frac{2}{4}\log_2\frac{2}{4} = 1 \quad \text{(Expression 6)}$$

$$H(S_1^R) = -\frac{3}{4}\log_2\frac{3}{4} - \frac{1}{4}\log_2\frac{1}{4} = 0.811$$

Further, the entropies of the divided sets $S^L_2$ and $S^R_2$ for the candidate 2 are calculated as shown by the below-shown Expression 7 by using the above-shown Expression 4.

$$H(S_2^L) = -\frac{1}{4}\log_2\frac{1}{4} - \frac{3}{4}\log_2\frac{3}{4} = 0.811 \quad \text{(Expression 7)}$$

$$H(S_2^R) = -\frac{4}{4}\log_2\frac{4}{4} - \frac{0}{4}\log_2\frac{0}{4} = 0$$

Therefore, the information gains $I_1$ and $I_2$ of the candidates 1 and 2, respectively, are calculated as shown by the below-shown Expression 8 by using the above-shown Expression 3.

$$I_1 = 0.954 - \frac{4}{8}H(S_1^L) - \frac{4}{8}H(S_1^R) = 0.0485 \quad \text{(Expression 8)}$$

$$I_2 = 0.954 - \frac{4}{8}H(S_2^L) - \frac{4}{8}H(S_2^R) = 0.549$$

Since the information gain $I_1$ is smaller than the information gain $I_2$ ($I_1<I_2$) based on Expression 8, the branch function candidate $Fc_2$ is adopted as the branch function F of the parent node. Further, nodes corresponding to the sets $S^L_2$ and $S^R_2$ are defined as child nodes for the aforementioned parent node. That is, in the case where the parent node is the node 1, i.e., the root node, the node corresponding to the set $S^R_2$ becomes the node 2. The node corresponding to the set $S^L_2$ becomes the node 3.

Next, the process moves to the next node (step S446). Note that when there is a child node as in the case of the above-described node, the process moves to the child node. On the other hand, when there is no child node, the process moves to another node for which the process has not been finished yet. Then, it is determined whether or not the entropy of the node to be processed is zero or whether or not the node has reached the specified depth (step S448). When the entropy of the node to be processed is zero or when the node has reached the specified depth (Yes at step S448), that node is determined to be a terminal node. Then, an appearance probability P for a "question class" that is assigned to the terminal node is calculated (step S450). On the other hand, when the entropy of the node to be processed is not zero and the node has not reached the specified depth yet (No at step S448), that node is determined to be a branch node. Therefore, for this node, the processes in the steps S440 to S444 are repeated.

Specifically, in the example shown in FIG. 16, the entropy of the set $S^R_2$ is zero. Therefore, the node corresponding to this set $S^R_2$ is determined to be a terminal node. Then, an appearance probability P (P=1) for a "question class" that is assigned to this node is calculated. Note that when the entropy is zero, the appearance probability P for a "question class" for that terminal node is one or zero.

Further, in the example shown in FIG. 16, the entropy of the set $S^{L1}$ is not zero. Therefore, when the depth of the node corresponding to this set $S^L_2$ has not reached the predetermined depth (the depth 3 in the example shown in FIG. 14), this node is determined as a branch node and the processes in the steps S440 to S444 are repeated. On the other hand, when the depth of the node corresponding to this set $S^L_2$ has reached the predetermined depth, this node is determined as a terminal node. Then, an appearance probability P (P=1/4) for a "question class" that is assigned to this node is calculated.

Next, it is determined whether or not decision trees are generated for all the subsets (step S452). When decision trees have not been generated for all the subsets (No at step S452), the process moves to the next subset for which a decision tree has not been generated yet (step S454) and the processes in the steps S440 to S450 are repeated. On the other hand, when decision trees have been generated for all the subsets (Yes at step S452), it means that the determination model has been completed and hence the process is finished. Note that the generation of a plurality of decision trees may be performed in parallel. That is, the generation of the decision trees Tree_1 to Tree_T can be simultaneously performed.

Next, a method for classifying feature vectors using a determination model is explained.

FIG. 17 is a diagram for explaining a method for classifying feature vectors by using the decision trees (the determination model) shown in FIG. 14 (i.e., the step S404 in FIG. 10). Firstly, a feature vector v is entered into the decision tree Tree_1. When the feature vector v is substituted into a branch function $F^1_1$ (a threshold $t^1_1$) at the node 1, the feature vector moves to a child node 2 on the right side according to Expression 2 because the function $F^1_1(v)$ is equal to or larger than the threshold $t^1_1$ ($F^1_1(v)≥t^1_1$). When the feature vector v is substituted into a branch function $F^1_1$ (a threshold $t^1_2$) at the node 2, the feature vector moves to a child node 5 on the left side according to Expression 2 because the function $F^1_2(v)$ is smaller than the threshold $t^1_2$ ($F^1_2(V)<t^1_2$). When the feature vector v is substituted into a branch function $F^1_5$ (a threshold $t^1_5$) at the node 5, the feature vector moves to a child node 9 on the left side according to Expression 2 because the function $F^1_5(v)$ is smaller than the threshold $t^1_5$ ($F^1_5(v)<t^1_5$). Further, since the node 9 is a terminal node, the probability that the feature vector v is classified into each class (i.e., into a question class or a non-question class) for the decision tree Tree_1 is a probability $P_1(c|v)$ associated with (i.e., assigned to) the node 9. In the example shown in FIG. 17, the probability that the feature vector v is classified into a question class is 0.6 (i.e., $P_1(c=1|v)=0.6$) and the probability that the feature vector v is classified into a non-question class is 0.4 (i.e., $P_1(c=2|v)=0.4$).

Further, when the feature vector v is entered into the decision tree Tree_T and the feature vector v is substituted into a branch function $F^T_1$ (a threshold $t^T_1$) at the node 1, the feature vector moves to a child node 3 on the left side according to Expression 2 because the function $F^T_1(v)$ is smaller than the threshold $t^T_1$ ($F^T_1(v)<t^T_1$). When the feature vector v is substituted into a branch function $F^T_3$ (a threshold $t^T_3$) at the node 3, the feature vector moves to a child node 7 on the left side according to Expression 2 because the function $F^T_3(v)$ is smaller than the threshold $t^T_3$ ($F^T_3(v)<t^T_3$). When the feature vector v is substituted into a branch function $F^T_7$ (a threshold $t^T_7$) at the node 7, the feature vector moves to a child node 10 on the right side according to Expression 2 because the function $F^T_7(v)$ is equal to or larger than the threshold $t^T_7$ ($F^T_7(v)≥t^T_7$). Further, since the node 10 is a terminal node, the probability that the feature vector v is classified into each class (i.e., into a question class or a non-question class) for the decision tree Tree_T, is a probability $P_T(c|v)$ associated with (i.e., assigned to) the node 10. In the example shown in FIG. 17, the probability that the feature vector v is classified into a question class is 0.8 (i.e., $P_T(c=1|v)=0.8$) and the probability that the feature vector v is classified into a non-question class is 0.2 (i.e., $Pr(c=2|v)=0.2$). In this way, the filler length determination unit 120 performs the above-described process for the decision trees Tree_1 to Tree_T.

The filler length determination unit 120 calculates a unified probability $P(c|v)$ by using the probabilities $P_1(c|v)$ to $P_T(c|v)$ calculated in the respective decision trees by using the below-shown Expression 9.

$$P(c|v) = \frac{1}{T}\sum_{t=1}^{T} P_t(c|v) \qquad \text{(Expression 9)}$$

Then, the filler length determination unit 120 determines that the feature vector is classified into a class corresponding to a class c for which the probability $P(c|v)$ has a maximum value. For example, when the probability $P(c=1|v)$ is 0.7 (i.e., $P(c=1|v)=0.7$) and the probability $P(c=2|v)$ is 0.3 (i.e., $P(c=2|v)=0.3$), the filler length determination unit 120 determines that the feature vector is classified into a class corresponding to "c=1", i.e., into the question class.

The voice interaction apparatus 1 according to the fourth embodiment also determines whether or not a syntactic analysis result needs to be used to generate a response by using a result of a non-linguistic information analysis for user speech (i.e., by using a feature vector) that takes a shorter time than that for the syntactic analysis for the user speech. Further, the voice interaction apparatus 1 according to the fourth embodiment can adjust the length of a filler that is output between user speech and a response thereto according to the user speech. Accordingly, in the fourth embodiment, it is also possible to realize a more natural conversation between the voice interaction apparatus 1 and a user.

Further, in the fourth embodiment, it is possible to determine whether or not a syntactic analysis result needs to be used to generate a response by using a determination model that is generated in advance through machine learning, and thereby to adjust the length of a filler that is output between user speech and a response thereto according to the user speech. Note that by using the determination model generated through machine learning, it is possible to perform more accurate discrimination (i.e., more accurate determination). Therefore, it is possible to adjust the length of a filler that is output between user speech and a response thereto more accurately than that in the second and third embodiments.

Note that in the fourth embodiment, it is necessary to prepare a determination model in advance. Therefore, the above-described processes according to the second and third embodiments can be carried out more easily than that according to the fourth embodiment.

MODIFIED EXAMPLES

Note that the present disclosure is not limited to the above-described embodiments, and various modifications can be made without departing from the spirit and scope of the present disclosure. For example, the order of a plurality of processes in the above-described flowcharts can be changed as appropriate. Further, at least one of the plurality of processes in the above-described flowcharts may be omitted. Further, a filler does not necessarily have to be generated at all times. For example, a filler may be generated at a rate of once in every two user speeches.

Further, in the above-described embodiments, a filler length is adjusted by performing a non-linguistic information analysis for user speech. However, it is possible to use other methods in addition to the non-linguistic information analysis for user speech. For example, an image recognition process may be performed for a camera image obtained by photographing a user by a camera installed in the voice interaction apparatus 1 and a result of this image recognition process (e.g., a facial expression or the like of the user) may be used. In this way, it is possible to determine whether or not the syntactic analysis result needs to be used to generate a response more accurately than that in the case where only the non-linguistic information analysis result is used.

Further, it is possible to determine whether or not user speech is a question by using a determination formula other than the determination formulas explained in the above-described second and third embodiments. For example, it may be determined that user speech is a question when an inclination of a pitch (i.e., a fundamental frequency f0) at the phrase end (i.e., $x_4$ in FIG. 13) is larger than a predetermined threshold.

Further, some of the processes performed by the non-linguistic information analysis unit 106 may be performed in the syntactic analysis unit 104. That is, the syntactic analysis unit 104 may perform some of the processes performed in the non-linguistic information analysis unit 106 when it is necessary to perform a syntactic analysis. Therefore, the syntactic analysis unit 104 may perform a syntactic analysis by using an analysis result of the non-linguistic information analysis unit 106.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A voice interaction apparatus configured to have a conversation with a user by using a voice, comprising:
   a speech acquisition unit configured to acquire user speech, the user speech being speech given by the user;
   a syntactic analysis unit configured to perform a syntactic analysis for linguistic information on the acquired user speech;
   a response generation unit configured to generate a first response according to the user speech;

a voice output unit configured to output a voice for the user;

a non-linguistic information analysis unit configured to analyze non-linguistic information for the acquired user speech, the non-linguistic information being different from the linguistic information and including at least one of prosodic information on the user speech and history information about a second response generated by the response generation unit;

a filler length determination unit configured to determine a length of a filler output by the voice output unit according to a non-linguistic information analysis result, the non-linguistic information analysis result being a result of an analysis by the non-linguistic information analysis unit; and a filler generation unit configured to generate a filler having a length corresponding to a result of a determination by the filler length determination unit, wherein the filler length determination unit determines that a long filler should be generated when a syntactic analysis result needs to be used to generate the first response and determines that a short filler should be generated when the syntactic analysis result does not need to be used to generate the first response, the syntactic analysis result being a result of an analysis by the syntactic analysis unit, and the voice output unit outputs the first response generated by the response generation unit after outputting the filler.

2. The voice interaction apparatus according to claim 1, wherein the filler length determination unit determines whether or not the acquired user speech is a question put to the voice interaction apparatus, and wherein when the filler length determination unit determines that the acquired user speech is a question put to the voice interaction apparatus, the filler length determination unit determines that a long filler should be generated;

the voice output unit outputs the long filler generated by the filler generation unit;

the response generation unit generates an answer to the question as the first response by using the syntactic analysis result; and the output unit outputs the generated answer.

3. The voice interaction apparatus according to claim 1, wherein the filler length determination unit determines whether or not the acquired user speech is a question put to the voice interaction apparatus, and wherein when the filler length determination unit determines that the acquired user speech is not a question put to the voice interaction apparatus, the filler length determination unit determines that a short filler should be generated;

the voice output unit outputs the short filler generated by the filler generation unit;

the response generation unit generates a response for guiding the conversation to a different topic without using the syntactic analysis result; and the output unit outputs the generated response for guiding the conversation to a different topic.

4. The voice interaction apparatus according to claim 1, wherein the filler length determination unit determines the length of the filler output by the voice output unit based on a comparison between at least one feature quantity included in the non-linguistic information analysis result and a predetermined threshold corresponding to the feature quantity.

5. The voice interaction apparatus according to claim 1, wherein the filler length determination unit determines the length of the filler by determining whether or not a feature indicated in the non-linguistic information analysis result corresponds to a necessity to use the syntactic analysis result to generate the first response by using a determination model that is generated in advance through mechanical learning.

6. A voice interaction method performed by using a voice interaction apparatus configured to have a conversation with a user by using a voice, comprising:

acquiring user speech, the user speech being speech given by the user;

performing a syntactic analysis for linguistic information on the acquired user speech;

generating a first response according to the user speech analyzing non-linguistic information for the acquired user speech, the non-linguistic information being different from the linguistic information and including at least one of prosodic information on the user speech and history information about a second response generated by the voice interaction apparatus;

determining whether or not a syntactic analysis result needs to be used to generate the first response according to a non-linguistic information analysis result, the syntactic analysis result being a result of the syntactic analysis, the non-linguistic information analysis result being a result of the analysis of the non-linguistic information;

generating and outputting a long filler when it is determined that the syntactic analysis result needs to be used to generate the first response, and generating and outputting a short filler when it is determined that the syntactic analysis result does not need to be used to generate the response; and outputting a voice corresponding to the first response generated according to the user speech after outputting the filler.

* * * * *